United States Patent
Ramle et al.

(10) Patent No.: US 11,297,551 B2
(45) Date of Patent: Apr. 5, 2022

(54) METHOD AND NODE FOR HANDLING HANDOVER IN 5G NETWORKS

(71) Applicant: Telefonaktiebolaget LM Ericsson (publ), Stockholm (SE)

(72) Inventors: Peter Ramle, Mölnlycke (SE); Qian Chen, Mölndal (SE); Josefin Karlsson, Torslanda (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/495,882

(22) PCT Filed: Nov. 22, 2017

(86) PCT No.: PCT/EP2017/080110
§ 371 (c)(1),
(2) Date: Sep. 20, 2019

(87) PCT Pub. No.: WO2018/171916
PCT Pub. Date: Sep. 27, 2018

(65) Prior Publication Data
US 2020/0112898 A1 Apr. 9, 2020

Related U.S. Application Data

(60) Provisional application No. 62/474,392, filed on Mar. 21, 2017.

(51) Int. Cl.
*H04W 36/08* (2009.01)
*H04W 8/08* (2009.01)
(Continued)

(52) U.S. Cl.
CPC ............ *H04W 36/08* (2013.01); *H04W 8/08* (2013.01); *H04W 48/16* (2013.01); *H04W 48/20* (2013.01); *H04W 80/10* (2013.01)

(58) Field of Classification Search
CPC . H04W 36/08; H04W 36/0011; H04W 80/10; H04W 8/08; H04W 48/16; H04W 48/20
See application file for complete search history.

(56) References Cited

U.S. PATENT DOCUMENTS

2008/0062926 A1* 3/2008 Oba ................ H04W 80/04
370/331
2020/0120570 A1* 4/2020 Youn ............... H04W 36/0033

FOREIGN PATENT DOCUMENTS

CN       101785236 A      7/2010
CN       106165524 A      11/2016
(Continued)

OTHER PUBLICATIONS

62434433,Specification_-_Not_in_English,Dec. 15, 2016 (Year: 2016).*
(Continued)

*Primary Examiner* — Chi H Pham
*Assistant Examiner* — Ji-Hae Yea
(74) *Attorney, Agent, or Firm* — Rothweil, Figg, Ernst & Manbeck, P.C.

(57) ABSTRACT

The embodiments herein relate to a method performed by an AMF (106) for handling handover. The AMF (106) receives one of: a handover required message and a first request message. The handover required message is received from an S-RAN (104*s*) and the first request message is received from another AMF (106) in response to the handover required message. The AMF (106) sends to a SMF (108), a set of one or more first request messages and activates a timer. The AMF (106) determines whether at least one of the following is true: a certain amount of time has elapsed since the timer was activated and the AMF (106) has received a first PDU response message for each one of the first PDU request messages. The AMF (106) transmits a handover
(Continued)

request message to a T-RAN (104*t*) as a result of determining that at least one of the conditions is true.

20 Claims, 12 Drawing Sheets

(51) Int. Cl.
  *H04W 48/16* (2009.01)
  *H04W 48/20* (2009.01)
  *H04W 80/10* (2009.01)

(56) References Cited

FOREIGN PATENT DOCUMENTS

| | | | |
|---|---|---|---|
| EP | 2959719 A1 | 12/2015 | |
| WO | WO-2018111029 A1 * | 6/2018 | ............ H04W 76/11 |

OTHER PUBLICATIONS

62434433,Specification,Jun. 13, 2019 (Year: 2019).*
62530854,Specification_-_Not_in_English,Jul. 11, 2017 (Year: 2017).*
62530854,Specification,Jun. 13, 2019 (Year: 2019).*
62573163,Specification_-_Not_in_English,Oct. 17, 2017 (Year: 2017).*
62573163,Specification,Jun. 13, 2019 (Year: 2019).*
62577658,Specification_-_Not_in_English,Oct. 26, 2017 (Year: 2017).*
62577658,Specification,Jun. 13, 2019 (Year: 2019).*
62586182,Specification_-_Not_in_English,Nov. 15, 2017 (Year: 2017).*
62586182,Specification,Jun. 13, 2019 (Year: 2019).*
International Search Report and Written Opinion dated Feb. 22, 2018 issued in International Application No. PCT/EP2017/080110. (12 pages).
Ericsson, "Handover procedure", SA WG2 Meeting #120; S2-172816 (Mar. 2017). (5 pages).
Samsung, "NG2-based Handover procedure", SA WG2 Meeting #118; S2-166742 (Nov. 2016). (6 pages).
3GPP TS 23.401 V9.16.0 (Dec. 2014); 3rd Generation Partnership Project; Technical Specification Group Services and System Aspects; General Packet Radio Service (GPRS) enhancements for Evolved Universal Terrestrial Radio Access Network (E-UTRAN) access (Release 9); (Dec. 2014). (256 pages).
3GPP TS 23.501 V0.3.0 (Feb. 2017); 3rd Generation Partnership Project; Technical Specification Group Services and System Aspects; System Architecture for the 5G System; Stage 2 (Release 15); (Feb. 2017). (97 pages).
3GPP TS 23.502 V0.2.0 (Feb. 2017); 3rd Generation Partnership Project; Technical Specification Group Services and System Aspects; Procedures for the 5G System; Stage 2 (Release 15); (Feb. 2017). (71 pages).
3GPP TR 23.799 V14.0.0 (Dec. 2016); 3rd Generation Partnership Project; Technical Specification Group Services and System Aspects; Study on Architecture for Next Generation System (Release 14); (Dec. 2016). (522 pages).
NEC, "pCR to TR 33.899: Inter AMF, Inter NG RAN handover without Xn interface", 3GPP TSG SA WG3 (Security) Meeting #86bis, S3-170819, Mar. 27-31, 2017, Busan (Korea) (3 pages).

* cited by examiner

METHOD AND NODE FOR HANDLING HANDOVER IN 5G NETWORKS

CROSS REFERENCE TO RELATED APPLICATION(S)

This application is a 35 U.S.C. § 371 National Stage of International Patent Application No. PCT/EP2017/080110, filed Nov. 22, 2017, designating the United States and claiming priority to U.S. provisional application no. 62/474,392, filed on Mar. 21, 2017. The above identified applications are incorporated by reference.

TECHNICAL FIELD

Embodiments herein relate generally to an Access and Mobility Management Function (AMF) and a method performed by the AMF. More particularly the embodiments herein relate to handling handover.

BACKGROUND

The Next Generation (NG) mobile wireless communication system, which is referred to as "5G," will support a diverse set of use cases and a diverse set of deployment scenarios. 5G will encompass an evolution of today's 4G Long Term Evolution (LTE) networks. The terms 5G and 4G are short for fifth generation and fourth generation.

Reference point representation of the 5G architecture has been decided by the 3GPP. Two examples of this representation are provided in FIGS. 1 and 2.

FIG. 1 illustrates a non-roaming architecture view for next generation (NG) networks. In other words, FIG. 1 illustrates a non-roaming 5G system architecture in reference point representation. FIG. 1 illustrates a UE 102 that is adapted to be connected to a (Radio) Access Network ((R)AN) 104. The parenthesis in the (R)AN 104 indicates that the term refers to an AN or a RAN. The (R)AN may comprise an AN node, a RAN node, a (R)AN node etc. In the text herein, the terms (R)AN or RAN may be used when referring to the (R)AN node, AN node or RAN node. The (R)AN 104 in the NG network may also be referred to as a NG (R)AN or NG RAN. The (R)AN 104 is adapted to be connected to an AMF 106 via a N2 reference point. N14 is a reference between two AMFs 106, however only one AMF 106 is illustrated in FIG. 1 for the sake of simplicity. The UE 102 is adapted to be connected to the AMF 106 via a N1 reference point. The AMF 106 is adapted to be connected to a SMF 108 via a N11 reference point. The (R)AN 104 is adapted to be connected to a User Plane Function (UPF, UP function) 110 via a N3 reference point. Two UPFs 110 are adapted to be connected to each other via a N9 reference point, however only one UPF 110 is illustrated here for the sake of simplicity.

The UPF 110 is adapted to be connected to the SMF 108 via a N4 reference point. The SMF 108 is adapted to be connected to a Policy Control Function (PCF) 113 via a N7 reference point. The PCF 113 and the AMF 106 are adapted to be connected to each other via a N15 reference point. The PCF 115 is adapted to be connected to an Application Function (AF) 115 via a N5 reference point. The UPF 110 is adapted to be connected to a Data Network (DN) 120 via a N6 reference point. An Authentication Server Function (AUSF) 122 is adapted to be connected to the AMF 106 via a N12 reference point. The AUSF 122 is adapted to be connected to a Unified Data Management (UDM) 123 via a N13 reference point. The UDM 123 may also be referred to as a UDM node. The UDM 123 is adapted to be connected to the AMF 106 via a N8 reference point and to the SMF 108 via a N10 reference point.

When the term function is used herein, e.g. as in application function, policy control function etc., such function may be implemented in a node, entity etc. Consequently, the AF may be referred to as an AF node, the PCF may be referred to as a PCF node etc.

The UE 102 may be a device by which a subscriber may access services offered by an operator's network and services outside operator's network to which the operators radio access network and Core Network (CN) provide access, e.g. access to the Internet. The UE 102 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, UE 102, lighting arrangements, tablet computer, laptop or Personal Computer (PC). The UE 102 may be portable, pocket storable, hand held, computer comprised, or vehicle mounted devices, enabled to communicate voice and/or data, via the radio access network, with another entity, such as another UE or a server.

The (R)AN 104 may be represented by a base station such as a NodeB, an evolved NodeB (eNodeB, eNB), gNodeB, gNB, Radio Network Controller (RNC), Base Station Controller (BSC), or any other network unit capable to communicate over a radio carrier with the UE 102 being served by the (R)AN 104.

FIG. 2 illustrates a roaming, e.g. home-routed, architecture view for next generation networks. In other words, FIG. 2 illustrates a roaming 5G system architecture home routed scenario in reference point representation. FIG. 2 illustrates a Home Public Land Mobile Network (HPLMN, H-PLMN) 200a and a Visited PLMN (VPLMN, V-PLMN) 200b. The letters a and b are used in reference numbers in FIG. 2 in order to clarify whether the entity is located in the HPLMN 200a or the VPLMN 200b, where a indicates the HPLMN and b indicates the VPLMN 200a. The vertical dotted line illustrates the division between the HPLMN 200a and the VPLMN 200a, i.e. the HPLMN 200a is on the right side of the dotted line and the VPLMN 200b is on the left side of the dotted line.

The UE 102 is in the VPLMN 200a and is adapted to be connected to the (R)AN 104 in the VPLMN 200b. The (R)AN 104 is adapted to be connected to the UPF 110 in the VPLMN 200b via a N3 reference point. The UE 102 is adapted to be connected to the AMF 106 via the N1 reference point, and the (R)AN 104 is adapted to be connected to the AMF 106 via the N2 reference point. The UPF 110 is adapted to be connected to a visited-SMF (V-SMF, VSMF) 108b via a N4 reference point. The V-SMF 108b is adapted to be connected to the AMF 106 via a N11 reference point. The AMF 106 is adapted to be connected to a Visited-PCF (V-PCF, VPCF) 113b via a N15 reference point. As mentioned above, the VPLMN 200a comprises a UPF 110. FIG. 2 illustrates that the HPLMN 200a also comprises a UPF 110. The UPF 110 in the VPLMN 200a is adapted to be connected to the UPF 110 in the HPLMN 200a via a N9 reference point. The UPF 110 in the HPLMN 200a is adapted to be connected to the DN 120 via a N6 reference point. The UPF 110 in the HPLMN 200a is adapted to be connected to a Home-SMF (H-SMF, HSMF) 108a via a N4 reference point. The H-SMF 108a in the HPLMN 200a is adapted to be connected to the V-SMF 108b in the VPLMN 200a via a N16 reference point. The H-SMF 108a is adapted to be connected to a Home-PCF (H-PCF, HPCF) 113a in the HPLMN 200a via a N7 reference point. The H-PCF 113a is adapted to be connected to an AF 115 via a N5 reference point. The H-SMF 108a is adapted to be connected to the UDM 123 via a N10 reference point. The UDM 123 is adapted to be connected to the AUSF 122 via a N13 reference point. The H-PCF 113a in the HPLMN 200a is adapted to be connected to the V-PCF 113b in the VPLMN 200b via an N7r reference point. The UDM 123 in the HPLMN 200a is adapted to be connected to the AMF 106 in the VPLMN 200a via a N8 reference point. The AMF 106 in the VPLMN 200b is adapted to be connected to the AUSF 122 in the HPLMN 200a via a N12 reference point.

As exemplified in FIG. 2, the HPLM 200a may comprise the DN 120, the UPF 110, the AF 115, the H-PCF 113a, the H-SMF 108a, the UDM and the AUSF. The VPLMN 200b is exemplified to comprise the UPF 110, the (R)AN 104, the UE 102, the V-SMF 108b, the AMF 106 and the V-PCF 113b. Note that the HPLMN 200a and the VPLMN 200b may comprise other entities in addition to or instead of the ones exemplified in FIG. 2. For example, the HPLMN 200a may comprise an AMF 106 in addition to the entities already illustrated in FIG. 2. An AMF 106 in the VPLMN 200b may be referred to as a Visited-AMF (V-AMF, VAMF) 106b, and an AMF 106 in the HPLMN 200a may be referred to as a Home-AMF (H-AMF, HAMF) 106a.

Handover may be described as the procedure for when a UE 102 is leaving an area served by one (R)AN 104, and moves to another area which is served by another (R)AN 104. In other words, the UE 102 is handed over from one (R)AN to another (R)AN. The (R)AN which currently serves the UE 102 may be referred to as a serving or source (R)AN (S-RAN, SRAN) and the (R)AN to which the UE 102 is to be handed over to may be referred to as a target (R)AN (T-RAN, TRAN). The (R)AN 104 which currently serves the UE 102 may be in the HPLMN 200a or the VPLMN 200b. The terms source (S) and target (T) may be used herein with the same meaning for other entities in the network such as e.g. S-AMF, T-AMF etc. The letters t and s are used in reference numbers in order to indicate whether the entity is a source entity or a target entity, where s indicates the source and t indicates the target. When the reference numbers do not have any t or s, they refer to any entity regardless of whether they are target or source entities. A source entity may be in the HPLMN 200a or in the VPLMN 200b, and the target entity may be in the HPLMN 200a or in the VPLMN 200b in which the source entity is not located.

It should be noted that the communication links in FIGS. 1 and 2 may be of any suitable kind including either a wired or wireless link. The links may use any suitable protocol depending on type and level of layer, e.g. as indicated by the Open Systems Interconnection (OSI) model.

Referring to FIGS. 1 and 2, the AMF 106 and SMF 108 represents the Control Plane (CP) of the core network and has the same functionality as the control plane parts of a Serving General Packet Radio Services (GPRS) Support Node (SGSN), MME, Gateway GPRS Support Node (GGSN), Serving Gateway (SGW) and Packet Data Network (PDN) Gateway (PGW) in Global System for Mobile communications (GSM) Enhanced Data rates for GSM Evolution (EDGE) Radio Access Network (GERAN), UTRAN and E-UTRAN. The PCF 113 is a similar function as the Policy and Charging Rules Function (PCRF) used for GERAN, UTRAN and E-UTRAN. The UDM 123 is the subscription information storage including all information for the subscribers of the operator. When a subscriber connects to the network, subscription information is retrieved from the UDM 123. In a roaming scenario such as in FIG. 2, the serving operator retrieves subscription information located in the home operator's network. The UDM 123 can be seen as similar to Home Subscriber Server (HSS) or Home Location Register (HLR), the first used for LTE/Evolved Packet System (EPS) and the second used for GERAN and UTRAN. Note that GERAN and UTRAN is not supported in 5G.

4G LTE uses an S1-based handover. This S1-based handover is described in 3GPP TS 23.401 v15.3.0 (March 2017), see e.g., clause 5.5.1.2.2S1-based handover, normal. Work on the specification for handover procedures for the 5G network has begun.

Currently, there is no N2 based handover included in the 5G specifications, e.g. 3GPP TS 23.501 and 23.502. N2 is a reference point between the Radio Access Network (RAN) and the Access and Mobility Management Function (AMF). Using 4G S1 handover as model for N2 based handover may work to some extent, but changes are needed due to several new concepts included in 5G that are not included in 4G (such as, for example, Mobility Management-Session Management (MM-SM) split, the possibility to have only some of the sessions as active, compared with Third Generation (3G), the possibility to use several network slices for a User Equipment (UE), and use of Session and Service Continuity (SSC) mode 2). Also the new low latency requirements for certain use cases puts new demands upon the handling of handover. The 51 mentioned above is a reference point between the Evolved-Universal Mobile Telecommunications System (UMTS) Terrestrial Radio Access Network (E-UTRAN) and the Mobility Management Entity MME in 4G. Therefore, there is a need to at least mitigate or solve this issue.

SUMMARY

An objective of embodiments herein is therefore to obviate at least one of the above disadvantages and to optimize handling of handover.

According to a first aspect, the object is achieved by a method performed by an AMF for handling handover. The AMF receives one of: a handover required message and a first request message. The handover required message is transmitted by a Source-Radio Access Network (S-RAN). The first request message is transmitted by another AMF in response to the handover required message transmitted by the S-RAN. The AMF sends a set of one or more first Protocol Data Unit (PDU) request messages to a SMF and activates a timer. The AMF determines whether at least one of the following is true: a certain amount of time has elapsed since the timer was activated and the AMF has received a first PDU response message for each one of the first PDU request messages sent to the SMF. The AMF transmits a handover request message to a Target-Radio Access Network (T-RAN) as a result of determining that at least one of the conditions is true.

According to a second aspect, the object is achieved by an AMF for handling handover. The AMF is adapted to receive one of: a handover required message and a first request message. The handover required message is transmitted by an S-RAN, and the first request message is transmitted by another AMF in response to the handover required message transmitted by the S-RAN. The AMF is adapted to send a set of one or more first PDU request messages to a SMF, and to activate a timer. The AMF is adapted to determine whether at least one of the following is true: a certain amount of time has elapsed since the timer was activated and the AMF has received a first PDU response message for each one of the first PDU request messages sent to the SMF. The AMF is adapted to transmit a handover request message to a T-RAN, as a result of determining that at least one of the conditions is true.

Thanks to the timer and the received first PDU response message, handling of handover is optimized in that a N2 based handover is enabled.

Embodiments herein afford many advantages, of which a non-exhaustive list of examples follows:

One advantage of the embodiments herein is that the introduction of a time budget, i.e. the timer activation, enables the network to limit the execution time for a handover, which is important for network slices that have very strict latency requirements.

Another advantage of the embodiments herein is that a mechanism is introduced for handling PDU sessions supporting SSC mode 2 with UPF relocation during handover. In this way the T-RAN does not need to allocate resources for PDU sessions that do not need to be set up. In a worst case, the T-RAN lacks these resources whereby there is a risk that a whole load based handover is canceled by the S-RAN.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments. The accompanying drawings, which are incorporated herein and form part of the specification, illustrate various embodiments.

The drawings are not necessarily to scale and the dimensions of certain features may have been exaggerated for the sake of clarity. Emphasis is instead placed upon illustrating the principle of the embodiments herein.

DETAILED DESCRIPTION

Handover procedure may apply for at least one of the following scenarios:
1) Intra NG RAN node.
2) Inter NG RAN node with Xn interface.
3) Intra AMF, intra SMF, inter NG RAN node without Xn interface.
4) Intra AMF, inter SMF, inter NG RAN node without Xn interface.
5) Inter AMF, inter and intra SMF, inter NG RAN node without Xn interface.

The Xn interface mentioned above is an interface between the two RANs 104, e.g. between two gNBs connected to the 5GCN.

This disclosure relates to bullet 3) intra AMF, intra SMF, inter NG RAN node without Xn interface.

This disclosure is related to optimized handling of handover and describes the following features:
1) Using a time budget, e.g., max delay parameters, to enable robust handling during time critical handover procedures.
2) A core network decision of whether to continue with seamless handover or non-seamless handover individually per PDU sessions indicated by the S-RAN PDU session as candidates for seamless handover. Information on the decision is provided to and used by source and T-RAN 104t and the UE 102.
3) Information to the S-RAN 104s about a reason for failure of the handover for a PDU session. This information is used by S-RAN 104s to decide if the handover shall proceed and is used primarily at handover due to load balancing reason.
4) Preparation of downlink (DL) User Plane (UP) paths at the target side, e.g. the VPLMN 200b, already in the preparation phase.
5) Directly after the UE 102 has entered the target side, e.g. the VPLMN 200b, each PDU Session and the SMF 108 is notified, thus enabling use of the already prepared DL user plan paths.

Figure 1:
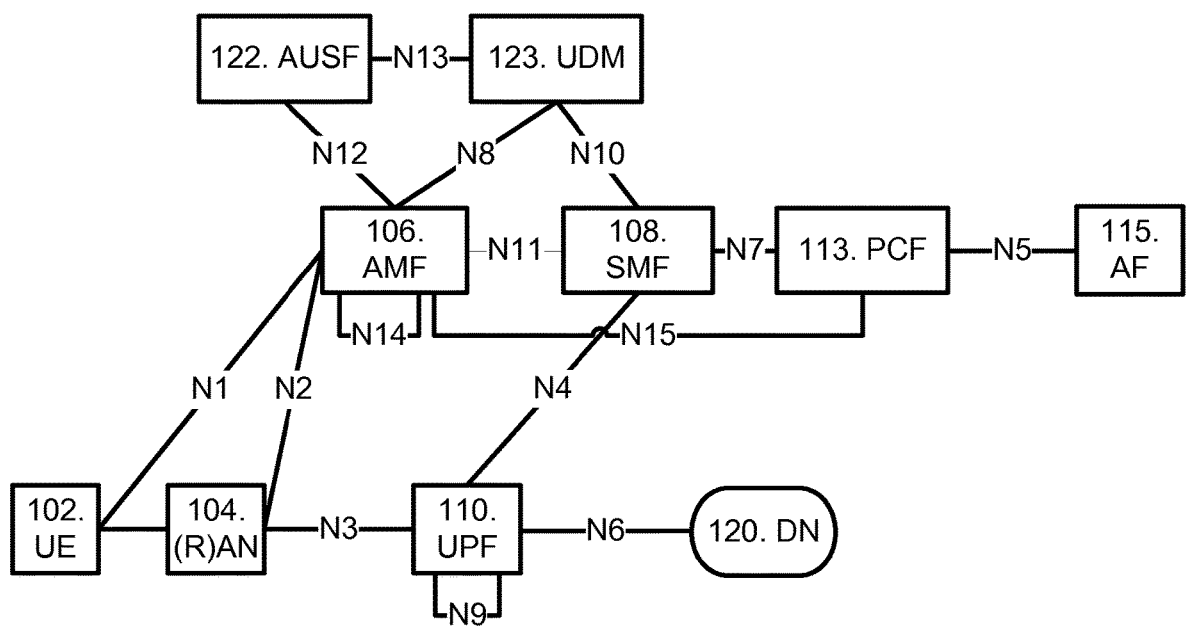
FIG. 1 illustrates a non-roaming architecture view for next generation networks.
Figure 2:
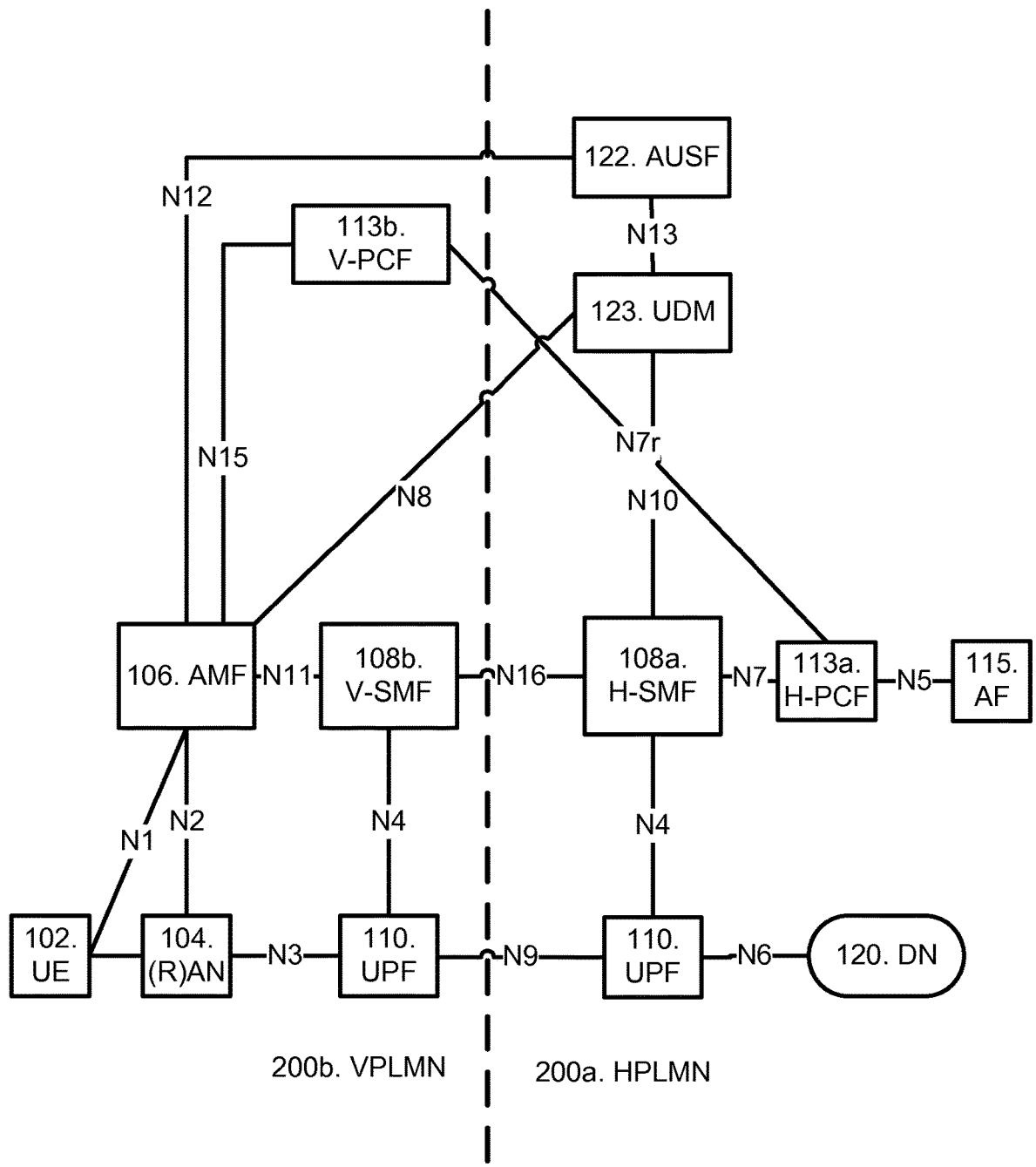
FIG. 2 illustrates a roaming, e.g. home-routed, architecture view for next generation networks.
Figure 3A:
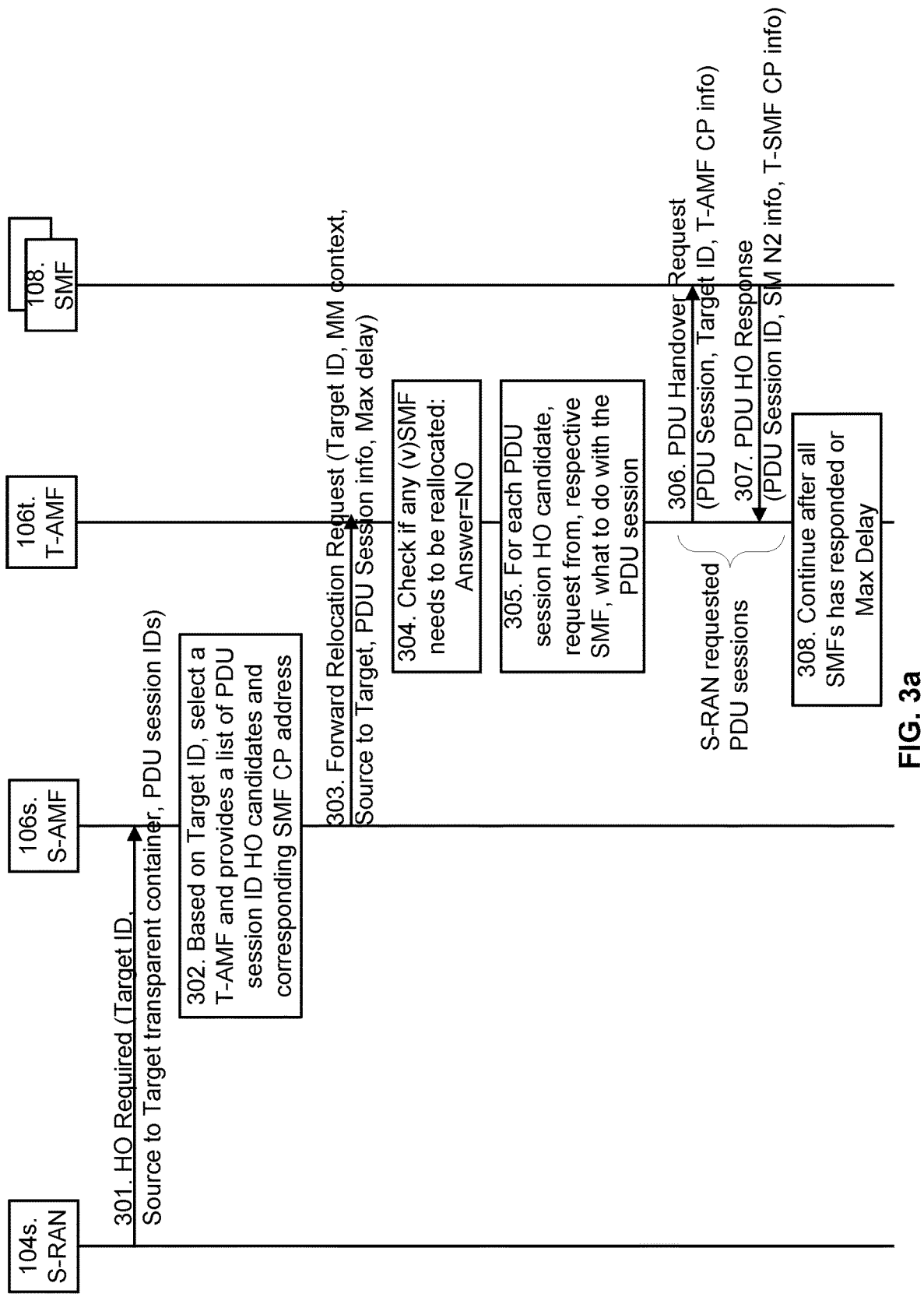
FIGS. 3a, 3b, 3c and 3d are message flow diagrams illustrating a handover procedure.
Figure 3B:
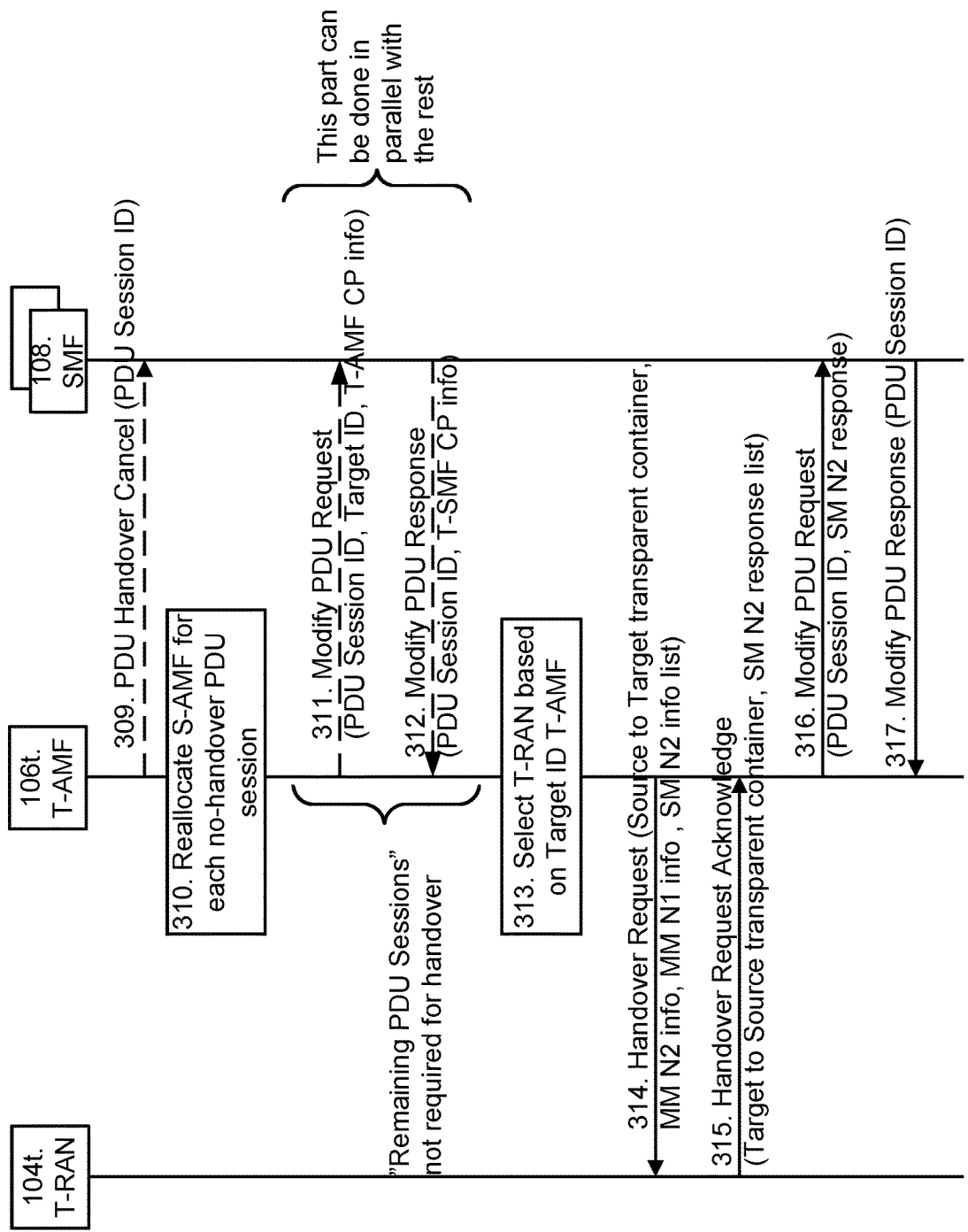
Figure 3C:
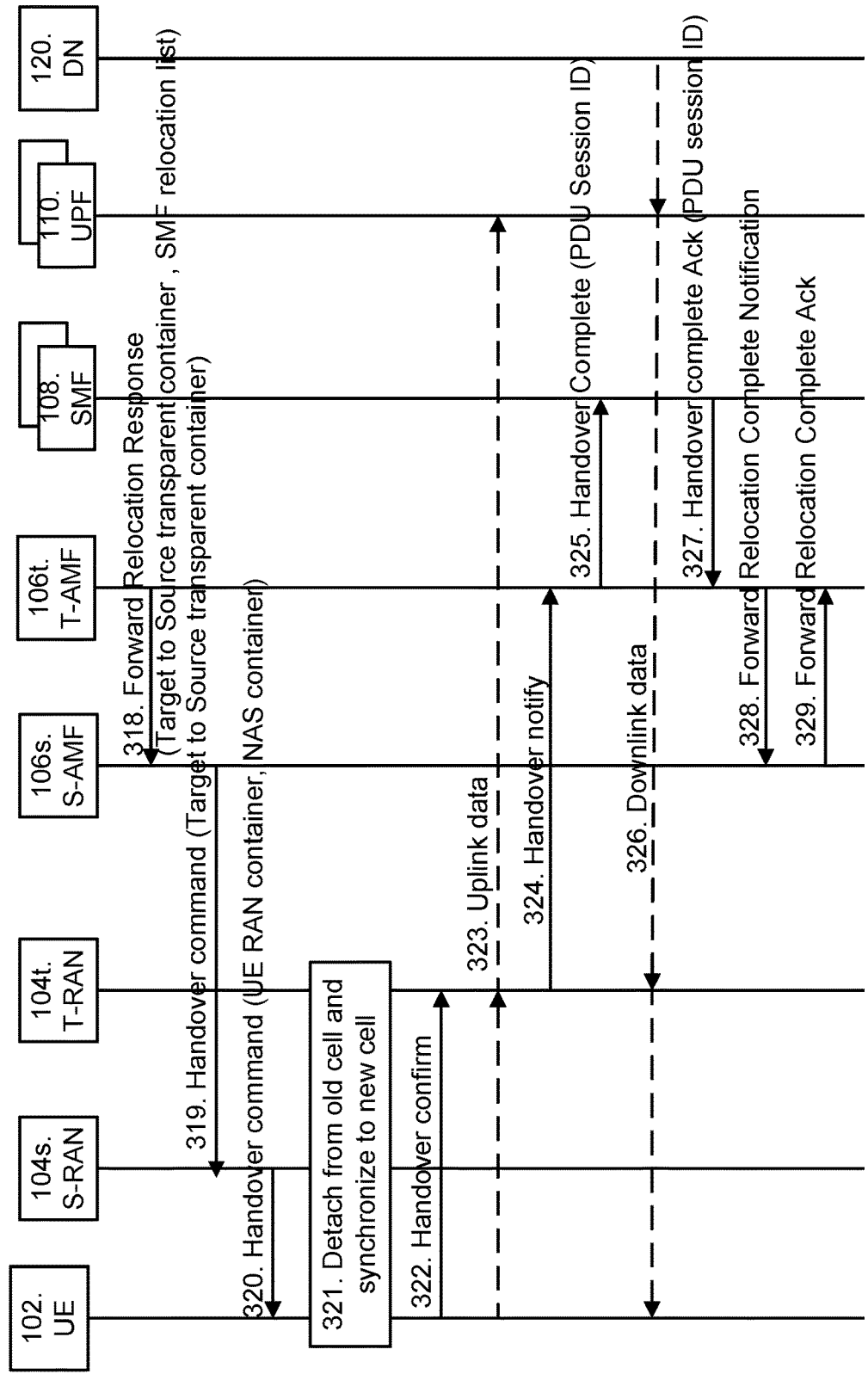
Figure 3D:
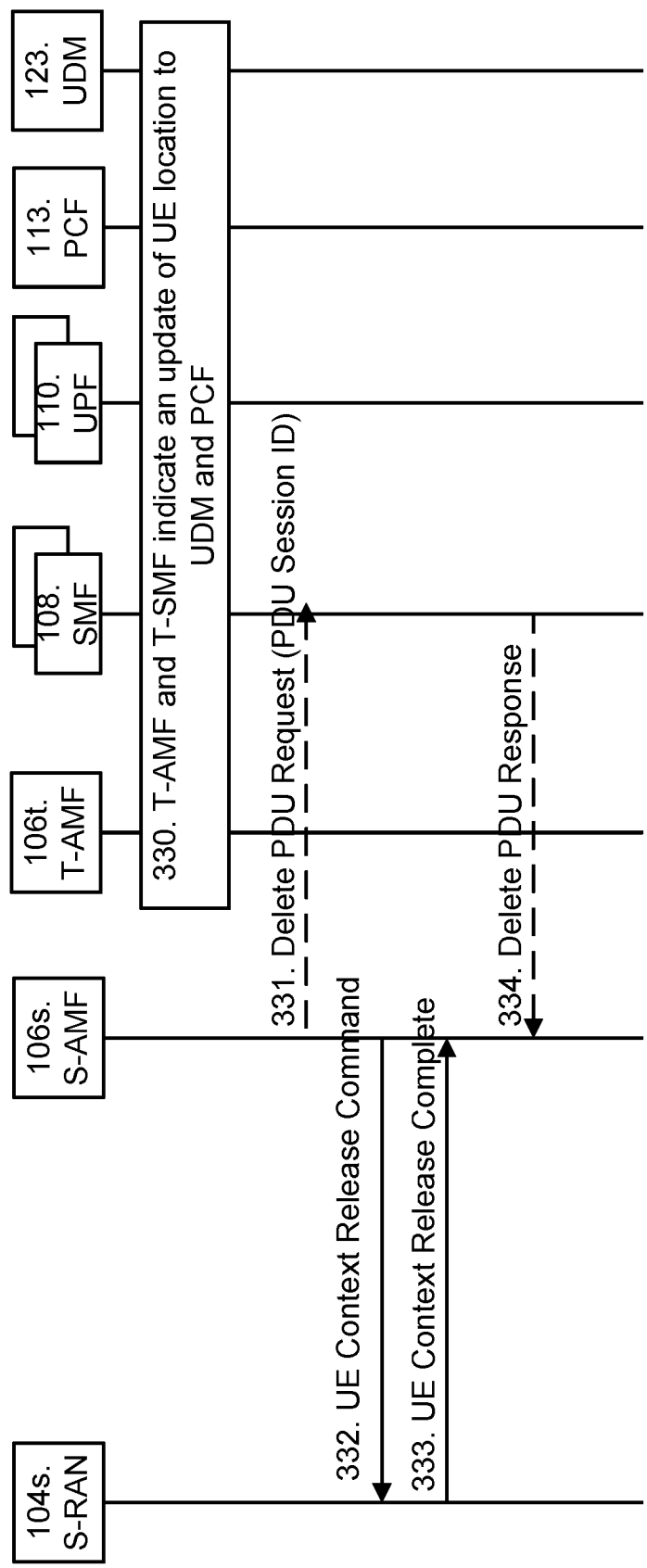

FIGS. 3a, 3b, 3c and 3d are message flow diagrams illustrating a handover procedure according to some embodiments. The handover procedure takes place in a NG network. A NG network may also be referred to as a 5G network. The handover procedure is for handover without an Xn interface. FIG. 3a comprises steps 301-308, FIG. 3b comprises steps 309-317, FIG. 3c comprises steps 318-329 and FIG. 3d comprises steps 330-334. FIG. 3b is a continuation of FIG. 3a, and FIG. 3c is a continuation of FIG. 3b, and FIG. 3d is a continuation of FIG. 3c. Note that the FIGS. 3a, 3b, 3c and 3d may be illustrated with different entities, and the reason for this is that each respective figure only illustrates the entities which are involved in the method steps which are illustrated in the respective figures. The entities which are not involved in a method steps in the respective figure is not illustrated. This done for the sake of simplicity.

FIG. 3a illustrates the S-RAN 104s, the S-AMF 106s, the T-AMF 106t and the SMF 108. FIG. 3b illustrates the T-RAN 104t, the T-AMF 106t and the SMF 108. FIG. 3c illustrates the UE 102, the S-RAN 104s, the T-RAN 104t, the S-AMF 106s, the T-AMF 106t, the SMF 108, the UPF 110 and the DN 120. FIG. 3d illustrates the S-RAN 104s, the S-AMF 106s, the T-AMF 106t, the SMF 108, the UPF 110, the PCF 113 and the UDM 123.

Optional steps are indicated with dotted arrows in FIGS. 3a, 3b, 3c and 3d. An optional step may also be referred to as a conditional step.

The procedure in FIGS. 3a, 3b, 3c and 3d comprises at least one of the following steps, which steps may be performed in any suitable order than described below:

Step 301

This step is seen in FIG. 3a. The S-RAN 104s sends a handover required message to the S-AMF 106s. The message comprises at least one of the following parameters: Target ID (T-ID), source to target transparent container and PDU session IDs. The S-AMF 106s receives the handover required message from the S-RAN 104s. A transparent container comprises information that is aimed for the T-RAN 104t and not intended to, or looked at by the S-AMF 106s and the T-AMF 106t.

The S-RAN 104s, i.e., the RAN 104 currently serving the UE 102, decides to initiate an N2-based handover to the T-RAN 104t. This can be triggered by, for example, due to new radio conditions or load balancing, Additionally, the N2-based handover may be used in situations where, for example:
 i) there is no Xn connectivity between the S-RAN 104s and the T-RAN 104t,
 ii) an error indication from the T-RAN 104t after an unsuccessful Xn-based handover, or
 iii) based on dynamic information obtained by the S-RAN 104s.

The source to target transparent container includes RAN information created by the S-RAN 104s to be used by the T-RAN 104t, and is transparent to 5GCN, e.g., transparent to the AMF 106. The PDU session IDs indicates the UE's PDU session(s) that the S-RAN 104s is requesting be handed-over to the T-RAN 104t. All PDU sessions handled by the S-RAN 104s, i.e. all existing PDU sessions with active user plane connections, shall be included in the handover required message.

Step 302

This step is seen in FIG. 3a. The S-AMF 106s selects a T-AMF 106t, and provides a list of PDU session ID handover candidates and corresponding SMF control plane addresses. The selection may be based on the target ID in the request message in step 301.

The S-AMF 106s determines whether the S-AMF 106s needs to be relocated. This determination may be based on the target ID. For example, in step 302, the S-AMF 106s determines a T-AMF 106t based on the target ID and Network Slice Selection Assistance information (NSSAI) as described in 3GPP TS 23.501. If the determined T-AMF 106t is not the same as the S-AMF 106s, then the S-AMF 106s determines that the S-AMF 106s must be relocated, i.e., that the selected T-AMF 106t should serve the UE 102 instead of the S-AMF 106s.

Prior to step 303, the S-AMF 106s retrieves all existing PDU sessions stored in the S-AMF 106s or in a Repository Storage Function (RSF). The existing PDU sessions may be PDU sessions with and without active user plane connections. All existing PDU Sessions are established, and for some or all of them payload paths may have been set up. Those with existing payload paths are the active PDU sessions and they have active user plane connections. The usage of RSF could e.g. be known by the S-AMF 106s as local configuration or upon a direct request by the S-AMF 106s to the RSF. For each of the existing PDU sessions, the PDU session information included in a Forward Relocation Request (FRR) message includes a corresponding N11 tunnel ID of the SMF 108, e.g. Tunnel Endpoint Identifier (TEID), and the SMF control plane address as known by the S-AMF 106s. The PDU sessions that are candidates for handover by the S-RAN 104s are indicated. The PDU session information also includes, per each PDU session ID, a max delay indication giving the maximum time the T-AMF 106t may wait for a response from the SMF 108 at N2 handover. The max delay is based on, for example, network slice. As one example, for each PDU session ID, the S-AMF 106s determines the network slice with which the PDU is associated and then determines the max delay value associated with the determined network slice. In this way, the S-AMF 106s determines each PDU session's max delay value and the max delay values are based on network slices. As another example, the max delay information is provided to the AMF 106 from, for example, the SMF 108 per each PDU session.

The term network slicing mentioned above will now be explained in short. Network slicing may be described as slicing the physical network into a plurality of virtual or physical networks. Each slice is dedicated for a specific service having certain characteristics and requirements.

Step 303

This step is seen in FIG. 3a. In response to determining to relocate the S-AMF 106s, the S-AMF 106s sends, to the selected T-AMF 106t, a FRR message that includes the target ID and the source to target transparent container that the S-AMF 106s received from the S-RAN 104s. The FRR message also includes:
 1) UE related MM information, e.g. MM context, and
 2) PDU session information such as e.g. max delay parameters.

The MM context may comprise e.g. security, subscription, and policy information such as, for example, service area restrictions, which is part of subscription information, policy information and local AMF dynamic information.

The message in step 303 also includes T-SMF control plane information which includes N11 control plane address and tunnel ID of the SMF 108 for the PDU session. The information is stored in the T-AMF 106t, and enables the T-AMF 106t to contact the SMFs 108.

Step 304

This step is seen in FIG. 3a. The T-AMF 106t selects a T-SMF 108t based on the target ID, a Single NSSAI (S-NSSAI), and the Data Network Name (DNN). That is, the T-AMF 106t checks if any (Visited-)SMF 108 need to be reallocated and if so selects a target SMF 108t based on the target ID, S-NSSAI and DNN. In this example there is no SMF reallocation.

Step 305

For each PDU session handover candidate, the T-AMF 106t requests, from the respective SMF 108, what to do with the PDU session. This step is further described in steps 306 and 307 below.

Step 306

In step 306, for each PDU-session indicated by the S-RAN 104s as an N2 handover candidate, the T-AMF 106t transmits to the respective SMF 108 a PDU handover request message. Note that there can be different SMFs 108 for different PDU sessions, but more than one PDU sessions may also be handled by the same SMF 108. The SMF 108 receives the PDU handover request message from the T-SMF 108t. The handover request message includes: a PDU session ID, the target ID, and T-AMF control plane information. The PDU session ID indicates a PDU session candidate for N2 handover. The T-AMF control plane information includes control plane address and tunnel ID of the T-AMF 106t. T-AMF control plane information is stored in the SMF 108. Additionally, in step 306 the T-AMF activates a timer. The timer may be associated with a maximum delay or a maximum wait time. For example, in step 306 the T-AMF 106t may activate a countdown timer to expire after X amount of time, e.g., X milliseconds, where X is determined based on the max delay values included in the FRR message. For instance, if the FRR includes N max delay values, then X may be set equal to min(MaxDelay[1], MaxDelay[2], . . . , MaxDelay[N]), wherein MaxDelay[i], where i=1 to N represents the N max delay values included in the FRR. N is a positive integer. As another example, activating the timer may simply entail the T-AMF 106*t* merely recording the current time or starting a stopwatch.
Step 307
This step is seen in FIG. 3*a*. For each PDU handover request received from the T-AMF 106*t*, the SMF 108 checks if N2 handover for the indicated PDU session can be accepted or not and includes the result in a PDU handover response message transmitted to the T-AMF 106*t*. The T-AMF 106*t* receives the PDU handover response message from the SMF 108. More specifically, the PDU handover response message includes SM N2 information that is intended for the T-RAN 104*t* and the SM N2 information includes an indication as to whether or not the N2 handover for the indicated PDU session can be accepted. The SM N2 information is transparent to the AMF 108. The decision by the SMF 108 as to whether the N2 handover for the indicated PDU session can be accepted depends on the Service and Session Continuity (SSC) mode applicable for the PDU session and the ability to keep (anchor) UPF 110. SSC mode 2 with UPF relocation is a reason for not acceptance. If for a PDU session, the UPF 110 is not kept, then the PDU session shall not be subject to seamless handover. If N2 handover for the PDU session is accepted, the SM N2 information also includes PDU session ID, N3 user plane address and tunnel ID of the UPF 110 and Quality of Service (QoS) parameters. The information PDU session ID is stored in the T-AMF 106*t*.

The target SMF 108 may also select a UPF 110 that supports the target ID. For this example, the UPF 110 is kept, i.e. the target ID is supported by the UPF 110.
Step 308
This step is seen in FIG. 3*a*. The T-AMF 106*t* determines whether it should proceed with the N2 handover procedure. The T-AMF 106*t* determines that it should continue with the N2 handover procedure if either one of the following two conditions is true:
1) The X amount of time has elapsed since the timer was activated, and
2) For each PDU handover request transmitted in step 306, the T-AMF 106*t* has received a corresponding PDU handover response from the SMF 108.

If neither condition is true, then the T-AMF 106*t* will simply repeat step 308 until one of the two conditions is true. Accordingly, in examples where X=min(Max Delay values), the lowest value of the max delay indications for the PDU sessions that are candidates for handover gives the maximum time the T-AMF 106*t* may wait for PDU handover response messages before continuing with the N2 handover procedure. At expiry of the maximum wait time or when all PDU handover response messages are received, the AMF 106 continues with the N2 handover procedure (handover request message in step 314).
Step 309
This step is seen in FIG. 3*b*. This is an optional step. If a PDU handover response messages is received after the T-AMF 106*t* has determined that the X amount of time has elapsed, then the T-AMF 106*t* may send a PDU handover cancel message comprising the PDU session ID to the SMF 108. The SMF 108 receives the PDU handover cancel message from the T-AMF 106*t*. Thus, a PDU handover response message that arrives too late is indicated to the SMF 108 allowing the SMF 108 to deallocate a possibly allocated N3 user plane address and tunnel ID of the selected UPF 110.

Step 310
This step is seen in FIG. 3*b*. The T-AMF 106*t* reallocates PDU sessions from the S-AMF 106*s* for each no-handover PDU session as explained in step 311 and step 312.
Step 311
This step is seen in FIG. 3*b*. This is a conditional step. The T-AMF 106*t* sends to the SMF 108 zero or more modify PDU request messages. The respective SMF 108 receives zero or more modify PDU request messages from the T-AMF 106*t*. Each message includes: a PDU session ID, the target ID, and T-AMF control plane information. This message is sent for each PDU-session that does not have an active user plane connection. T-AMF 106*t* selects the T-SMF 108*t* based on target ID, SM-NSSAI and DNN. T-AMF 106*t* checks if any (visited) SMF 108 need to be reallocated and if so selects the T-SMF 108*t* based on the target ID, SM-NSSAI and DNN. In this example there is no SMF reallocation. The PDU session ID included in the message indicates a PDU session without active user plane connections. A PDU session without active user plane connections is a PDU session not in the list of candidates from the S-RAN 104*s*. The T-AMF control plane information includes control plane address and tunnel ID of the T-AMF 106*t*. The SMF 108 stores T-AMF control plane information and it will be used by the SMF 108 upon a successful handover.
Step 312
This step is seen in FIG. 3*b*. This is a conditional step. The SMF 108 sends to the T-AMF 106*t* a modify PDU response message that includes: PDU session ID and T-SMF control plane information. The T-AMF 106*t* receives the modify PDU response message from the SMF 108. This message is sent for each received modify PDU request message. The T-SMF 108*t* selects a UPF 110 that supports the target ID. For this example, the UPF 110 is kept, i.e. the target ID is supported by the UPF 110. The T-SMF control plane information includes N11 control plane address and T-tunnel ID of the SMF 108 for the PDU session. The information is stored in the AMF 106 together with the PDU session ID.

Steps 311 and 312 may start at step 308 in FIG. 3 and be performed in parallel with that and later steps.
Step 313
This step is seen in FIG. 3*b*. The T-AMF 106*t* selects a T-RAN 104*t* based on target ID.
Step 314
This step is seen in FIG. 3*b*. The T-AMF 106*t* sends to the selected T-RAN 104*t* a handover request message that includes: the source to target transparent container, MM N2 information, MM N1 information, and SM N2 information list. The T-AMF 106*t* receives the handover request message from the T-AMF 106*t*. The T-AMF 106*t* has selected the T-RAN 104*t* based on target ID. The T-AMF 106*t* allocates a Globally Unique Temporary Identifier (GUTI), a registration area and a service area, valid for the UE 102 in the T-AMF 106*t* and target Tracking Area Identifier (TAI). As an alternative, the registration area and service area may be sent in a separate NAS message to the UE 102 when the UE 102 has successfully connected to the target side. The serviced area may be an allowed area or non-allowed area.

More specifically, in step 314, if the T-AMF 106*t* has received a corresponding PDU handover response message for all PDU sessions in step 307 in FIG. 3*a* or if the max delay had expired, i.e. one or several PDU sessions has not within the time limit responded to the AMF 106, in step 307, the T-AMF 106*t* sends a handover request message to the T-RAN 104*t*. The source to target transparent container is forwarded as received from the S-AMF 106*s*. The MM N2 information which is a part of the received MM context includes e.g. security information and handover restriction list. The MM N1 information includes the GUTI, a registration area and a service area, and is sent transparent via the T-RAN 104*t*, the T-AMF 106*t*, the S-AMF 106*t* and the S-RAN 104*s* to the UE 102. The service area may be an allowed area or a non-allowed area. The SM N2 information list includes the SM N2 information from the SMFs 108 in the PDU handover response messages received until the end of step 308.

The terms registration area and service area mentioned above will now be briefly explained. Within a service area the UE 102 may get service if it is an allowed area or it may not get service if it is in a non-allowed area. A registration area does not span over both an allowed and a non-allowed area, but it may be smaller than an allowed or a non-allowed area. The UE 102 shall perform a Registration area update while leaving its registration area. The same does not directly apply when leaving an allowed or a non-allowed area, but due to that the registration area does not span over both an allowed and a non-allowed area this will anyhow be the consequence. A registration area is defined in relation to where the network would need to page the UE 102 at a MT event and thus also in relation to when the UE 102 needs to perform a registration area update.

Step 315

This step is seen in FIG. 3*b*. The T-RAN 104*t* sends to the T-AMF 106*t* a handover request acknowledge message that includes: a target to source transparent container, PDU sessions failed to be setup list, and an SM N2 response list. The T-AMF 106*t* receives the handover request acknowledge message from the T-RAN 104*t*. The target to source transparent container includes a UE container with an Access Stratum (AS) part and a Non Access Stratum (NAS) part. A container may comprise several parameters aimed for the UE 102 and not for any of the mediating nodes. The UE container is sent transparently via the T-AMF 106*t*, the S-AMF 106*s* and the S-RAN 104*s* to the UE 102. The information provided to the S-RAN 104*s* also contains a list of PDU session IDs indicating PDU sessions failed to be setup and reason for the failure. The reason for the failure may be for example a SMF decision, SMF response too late, or a T-RAN decision. The NAS part of the UE container corresponds to the MM N1 information.

The SM N2 response list includes, per each received SM N2 information and by SMF accepted PDU session for N2 handover, a PDU session ID and an SM N2 response indicating the PDU session ID and if the T-RAN 104*t* accepted the N2 handover request for the PDU session. For each by T-RAN 104*t* accepted PDU session for the N2 handover, the SM N2 response includes N3 user plane address and tunnel ID of the T-RAN 104*t*.

Step 316

This step is seen in FIG. 3*b*. For each SM N2 response included in the SM N2 response list received from the T-RAN 104*t*, see step 315, the T-AMF 106*t* sends to the respective SMF 108 a modify PDU request message that includes the received SM N2 response and the respective PDU session ID. The SMF 108 receives the modify PDU request message from the T-AMF 106*t*. For those PDU sessions accepted by the T-RAN 104*t*, the modify PDU request message sent to the SMF 108 allows the SMF 108 to complete all handover preparations of the CN part of the control plane and the user plane in advance. Further, for the PDU sessions not accepted by the T-RAN 104*t*, the modify PDU request message allows the SMF 108 to remove any allocated resources. The SMF 108 stores the T-RAN user plane information and is used by the SMF 108 and the UPF 110 upon a successful handover. The SMF 108 may update the UPF 110 at this point or upon a successful handover notification.

Step 317

This step is seen in FIG. 3*b*. To acknowledge the modify request messages, the SMF 108 sends to the T-AMF 106*t* a modify PDU response message including a PDU session ID. The T-AMF 106*t* receives the modify PDU response message from the SMF 108. This message is sent for each received modify PDU request message. In step 317, the SMF 108 performs preparations for N2 handover by indicating N3 user plane address and tunnel ID of the T-RAN 104*t* to the UPF 110 if the N2 handover is accepted by the T-RAN 104*t*. If the N2 handover is not accepted by the T-RAN 104*t*, the SMF 108 deallocates the N3 user plane address and the tunnel ID of the selected UPF 110.

Step 318

This step is seen in FIG. 3*c*. The T-AMF 106*t* sends to the S-AMF 106*s* a Forward Relocation Request/Response (FRR) message including:
- the target to source transparent container, see step 315 in FIG. 3*b*,
- PDU sessions failed to be setup list, see step 315, and
- a SMF relocation list.

The S-AMF 106*s* receives the FRR message from the T-AMF 106*t*. The target to source transparent container, which is transparent to the T-AMF 106*t* and the S-AMF 106*t*, is forwarded as received. The SMF relocation list indicates the SMF(s) 108 that has been relocated. For this example, there is no SMF relocation.

Step 319

This step is seen in FIG. 3*c*. The S-AMF 106*s* sends to the S-RAN 104*s* a handover command including the target to source transparent container and PDU sessions failed to be setup list, both received from the T-AMF 106*t*. The S-RAN 104*s* receives the handover command from the S-AMF 106*s*. Also, the S-RAN 104*s* uses the list of PDU sessions failed to be setup and the indicated reason for failure to decide if to proceed with the N2 handover procedure.

Step 320

This step is seen in FIG. 3*c*. The S-RAN 104*s* sends to the UE 102 a handover Command message that includes: a UE container that was included in the target to source transparent container. The UE 102 receives the handover command message from the S-RAN 104*s*. More specifically, the S-RAN 104*s* unpacks the target to source transparent container to obtain the UE container, which is then transparently sent to the UE 102. The UE container included in the handover command sent to the UE 102 is constructed using the UE container part of the target to source transparent container sent transparently from the T-RAN 104*t* via the T-AMF 106*t* and the S-AMF 106*s* to the S-RAN 104*s*.

Step 321

This step is seen in FIG. 3*c*. The UE detaches from the old cell and synchronize to the new cell. The old cell may be referred to as a source cell and the new cell may be referred to as a target cell.

Step 322

This step is seen in FIG. 3*c*. The UE 102 send to the T-RAN 104*t* a handover Confirm message after the UE 102 has successfully synchronized to the target cell. The handover is by this message considered as successful by the UE 102.

Step 323

This step is seen in FIG. 3c. The step is an optional step. The UE 102 may send uplink (UL) data, via the T-RAN 104t, to the UPF 110.

Step 324

This step is seen in FIG. 3c. The T-RAN 104t sends to the T-AMF 106t a handover Notify message to indicate to the T-AMF 106t that the T-RAN 104t considers the handover to be successful. The T-AMF 106t receives the handover notify message from the T-RAN 104t.

Step 325

This step is seen in FIG. 3c. A handover complete message is sent per each PDU Session from the T-AMF 106t to the respective SMF 108 to indicate the success of the N2 handover. The SMF 108 receives the handover complete message from the T-AMF 106t.

Step 326

This step is seen in FIG. 3c. This is an optional step. The DN 120 may send downlink data, via the UPF 110, the T-RAN 104t, to the UE 102.

Before step 326 has been performed, the T-SMF 108t has sent to a selected UPF 110 a message with an indication that downlink user plane for each PDU session indicated in the message may be switched to the T-RAN 104t.

Step 327

This step is seen in FIG. 3c. The T-SMF 108t confirms reception of handover complete message by sending to the T-AMF 106t a handover complete acknowledgement message. The T-AMF 106t receives the handover complete acknowledgement message from the T-SMF 108t. The handover complete acknowledgement message comprises a PDU session ID.

Step 328

This step is seen in FIG. 3c. The T-AMF 106t indicates to the S-AMF 106s that the N2 handover has successfully been completed in the T-AMF 106t by transmitting to the S-AMF 106s a forward relocation complete notification message. The S-AMF 106s receives the forward relocation complete notification message from the T-AMF 106t. Also, the S-AMF 106s starts a timer to supervise when the resources in the S-RAN 104s shall be released and if the SMF 108 is relocated, and also release of the resources towards the S-SMF 108s.

Step 329

This step is seen in FIG. 3c. The S-AMF 106s acknowledge the reception of the forward relocation complete notification message from the T-AMF 106t by transmitting to the T-AMF 106t a forward relocation complete acknowledgement message. The T-AMF 106t receives the forward relocation complete acknowledgement message from the S-AMF 106s.

Step 330

This step is seen in FIG. 3d. The T-AMF 106t and the T-SMF 108t indicates a UE location update to the UDM 123 and PCF 113 respectively.

Step 331

This step is seen in FIG. 3d. This step is an optional step. The S-AMF 106s may send to the SMF 108 a delete PDU request message comprising the PDU session ID. The SMF 108 may receive the delete PDU request message from the S-AMF 106s.

In the event of a change in the SMF 108, then, for each PDU session, the S-AMF 106s marks the PDU session references as deleted in the S-AMF 106s, and, for each PDU session, the S-AMF 106s sends to the SMF 108 a delete PDU request message including the PDU session ID for the PDU session.

Step 332

This step is seen in FIG. 3d. The S-AMF 106s sends a UE context release command to the S-RAN 104s. The S-RAN 104s receives the UE context release command from the S-AMF 106s.

Step 333

This step is seen in FIG. 3d. As a result of receiving the UE context release command, the S-RAN 104s releases its resources related to the UE 102 and responds to the S-AMF 106s by sending to the S-AMF 106s a UE context release complete message. The S-AMF 106s receives the UE context release complete message from the S-RAN 104s.

Step 334

This step is seen in FIG. 3d. This step is an optional step. As result of receiving a delete PDU request identifying a PDU session, the SMF 108 removes the PDU session related information for the identified PDU session that the SMF 108 was maintaining and sends a delete PDU response message to S-AMF 106s. The S-AMF 106s receives the delete PDU response message from the SMF 108.

For an inter NG RAN handover without an Xn interface, the S-RAN 104s may decide to initiate an N2 based handover to the T-RAN 104t. This can be triggered e.g. due to new radio conditions or load balancing and occurs e.g. if there is no Xn connectivity to the T-RAN 104t, an error indication from the T-RAN 104t after an unsuccessful Xn-based handover, or based on dynamic information learnt by the S-RAN 104s.

Figure 4A:
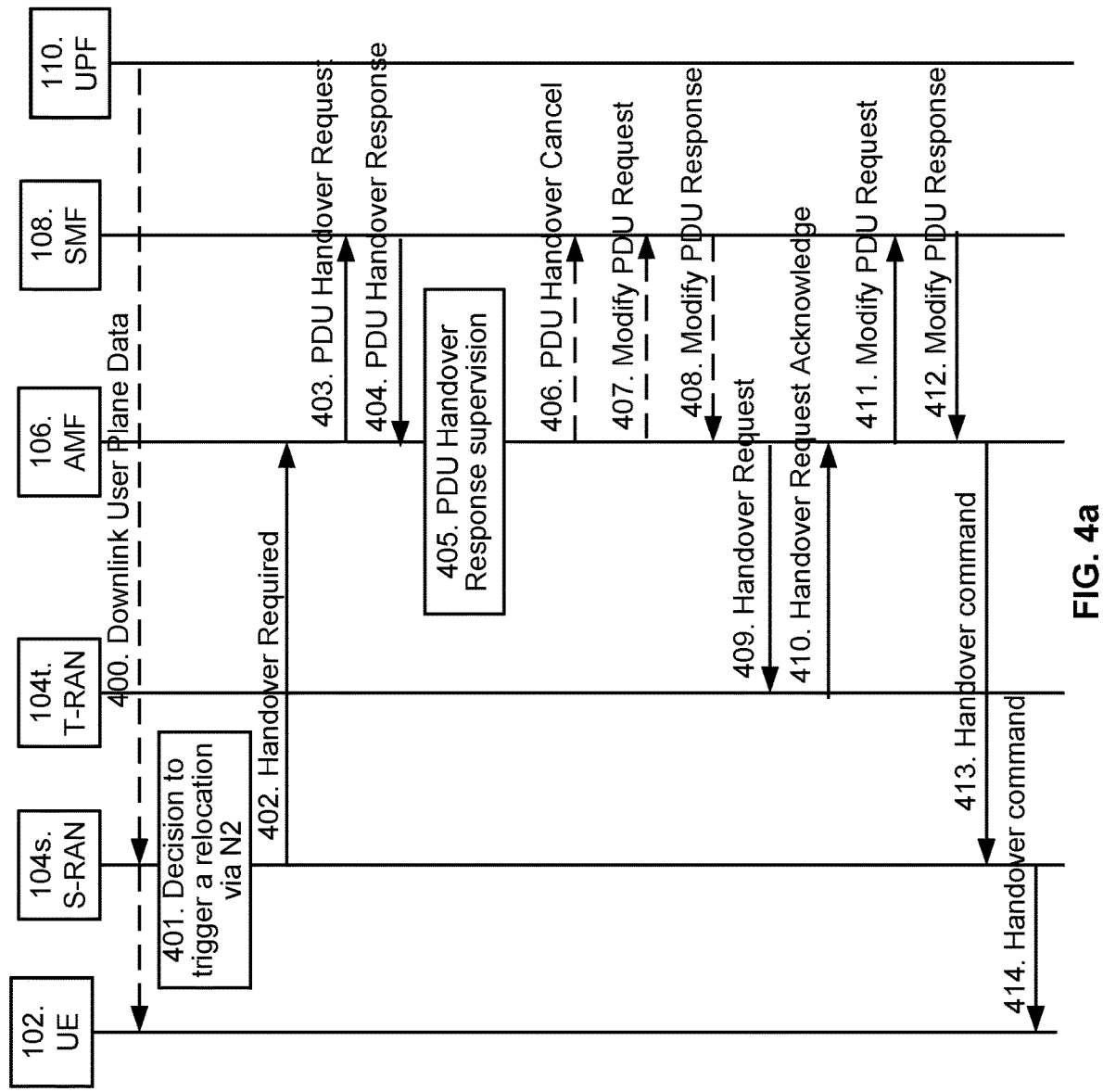
FIGS. 4a and 4b are signaling diagrams illustrating a handover procedure.
Figure 4B:
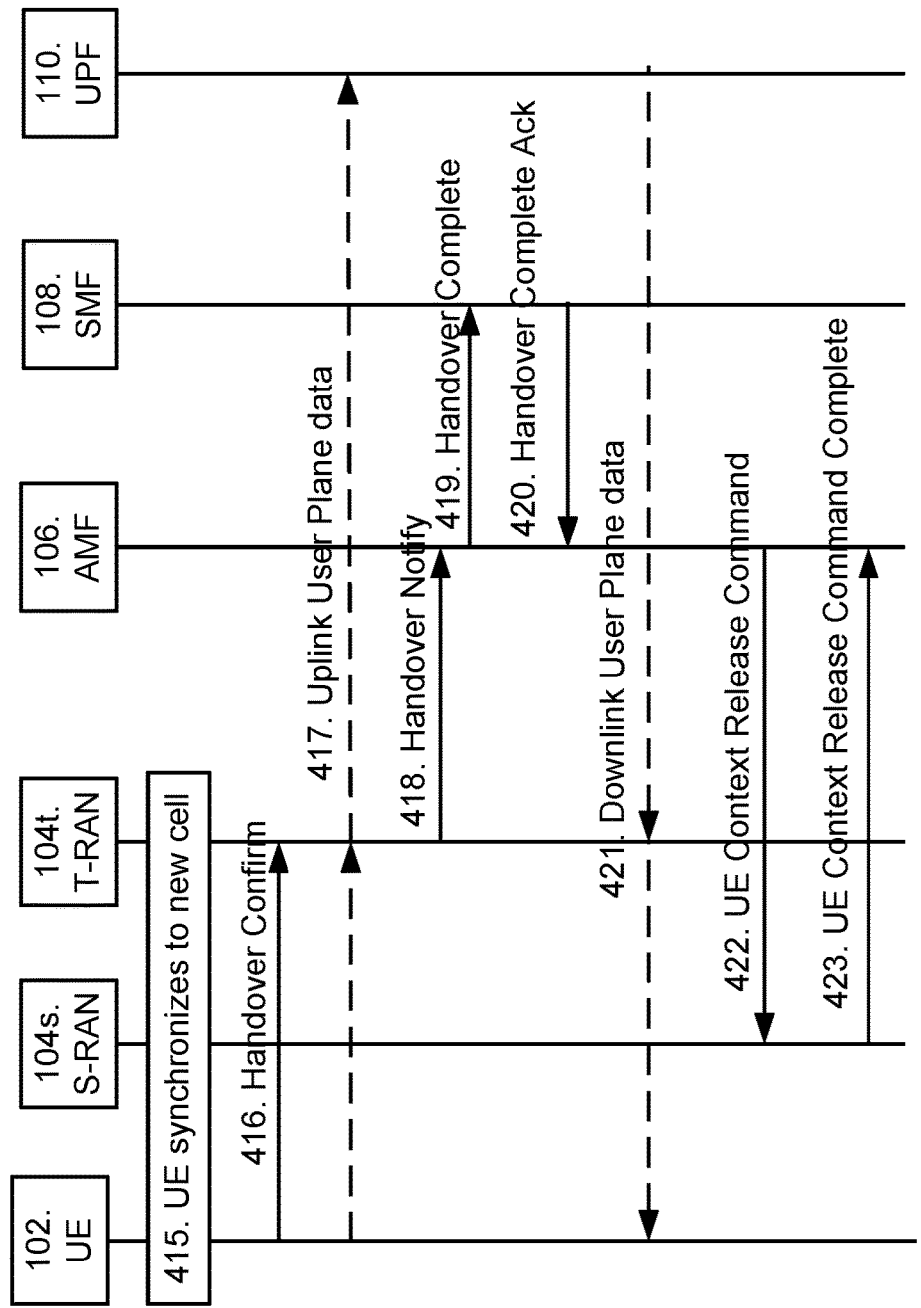

The intra AMF, intra SMF, inter NG RAN handover without Xn interface will now be described with reference to FIG. 4a and FIG. 4b. FIG. 4a comprises steps 400-414 and FIG. 4b comprises steps 415-423. FIG. 4b is a continuation of FIG. 4a. Optional steps in FIGS. 4a and 4b are indicated with dotted arrows. The handover procedure in FIGS. 4a and 4b comprises at least one of the following steps, which steps may be performed in any other suitable order than described below:

Step 400

This step is seen in FIG. 4a. Downlink user plane data may be sent from the UPF 110, via the S-RAN 104s to the UE 102.

Step 401

This step is seen in FIG. 4a. The S-RAN 104s takes a decision to trigger relocation via N2.

Step 402

This step is seen in FIG. 4a. This step corresponds to step 301 and 303 in FIG. 3a. The S-RAN 104s sends to the AMF 106 a handover required message. The AMF 106 receives the handover required message from the S-RAN 104s. The handover required message comprises at least one of the following parameters: target ID, source to target transparent container and PDU session IDs.

The source to target transparent container includes RAN information created by the S-RAN 104s to be used by the T-RAN 104t, and is transparent to 5GCN. All PDU sessions handled by the S-RAN 104s, i.e. all existing PDU sessions with active user plane connections, shall be included in the handover required message, indicating which of those PDU session(s) are requested by the S-RAN 104s to handover.

Step 403

This step is seen in FIG. 4a. This step corresponds to step 306 in FIG. 3a. The AMF 106 sends to the respective SMF 108 a PDU handover request message. The respective SMF 108 receives the PDU handover request message from the AMF 106. The PDU handover request message comprises at least one of the following parameters: PDU session ID, target ID and AMF control plane information.

This message is sent for each PDU-session indicated, by the S-RAN 104s, as an N2 handover candidate. The PDU session ID indicates a PDU session candidate for N2 handover. The AMF control plane information includes the control plane address and the tunnel ID of AMF.

Additionally, in step 403 the AMF 106 activates a timer at sending of the first step 403 message.

Step 404

This step is seen in FIG. 4a. This step corresponds to step 307 in FIG. 3a. The respective SMF 108 sends to the AMF 104 a PDU handover response message. The AMF 104 receives the PDU handover response message from the SMF 108. The PDU handover response message comprises at least one of the following parameters: PDU session ID, SM N2 information and the T-SMF control plane information.

The SMF 108 selects a UPF 110 that supports N3 connectivity towards the T-RAN node 104t.

The SMF 108 checks if the N2 handover for the indicated PDU session can be accepted and includes the result in the sent SM N2 information, transparently for the AMF 106, to the T-RAN 104t. If the N2 handover for the PDU session is accepted, then the SM N2 information also includes the PDU session ID, N3 user plane address and tunnel ID of UPF and QoS parameters.

The SMF control plane information includes N11 control plane address and tunnel ID of the SMF 108 for the PDU session.

Step 405

This step is seen in FIG. 4a. This step corresponds to step 308 in FIG. 3a. The AMF 106 supervises the PDU handover response messages from the involved SMFs 108. The lowest value of the Max delay indications for the PDU sessions that are candidates for handover gives the maximum time the AMF 106 may wait for PDU handover response messages before continuing with the N2 handover procedure. At expiry of the maximum wait time or when all PDU handover response messages are received, the AMF 106 continues with the N2 handover procedure, i.e. the handover request message in step 409 in FIG. 4a.

Step 406

This step is seen in FIG. 4a. This is an optional step. This step corresponds to step 309 in FIG. 3b. The AMF 106 sends to the SMF 108 a PDU handover cancel message. The SMF 108 receives the PDU handover cancel message from the AMF 106. The PDU handover cancel message comprises a PDU session ID.

A PDU handover response message arriving too late (see step 406) is indicated to the SMF 108 allowing the SMF 108 to deallocate a possibly allocated N3 user plane address and tunnel ID of the selected UPF 110.

Steps 407 and 408 may start at step 405 and be performed in parallel with that and later steps.

Step 407

This step is seen in FIG. 4a. This step is an optional step. This step corresponds to step 311 in FIG. 3b. The AMF 106 may send to the SMF 108 a modify PDU request message. The SMF 108 may receive the modify PDU request message from the AMF 106. The modify PDU request message comprises at least one of the following parameters: PDU session ID, target ID and AMF control plane information.

This message is sent for each PDU-session without existing PDU sessions having active user plane connections i.e. all possible PDU sessions not indicated, by the S-RAN 104s, as an N2 handover candidate.

The PDU session ID indicates a PDU session without active user plane connections, i.e. a PDU session not in the list of candidates from the S-RAN 104s. The AMF control plane information includes control plane address and tunnel ID of the AMF 106.

Step 408

This step is seen in FIG. 4a. This is an optional step. This step corresponds to step 312 in FIG. 3b. The SMF 108 may send to the AMF 106 a modify PDU response message. The AMF 106 may receive the modify PDU response message from the SMF 108. The modify PDU response message comprises at least one of the following parameters: PDU session ID and SMF control plane information.

This message is sent for each received modify PDU request message.

The SMF 108 selects a UPF 110 that supports N3 connectivity towards the T-RAN 104t.

The SMF control plane information includes N11 control plane address and T-tunnel ID of the SMF 108 for the PDU session.

Step 409

This step is seen in FIG. 4a. This step corresponds to step 314 in FIG. 3b. The AMF 106 sends to a T-RAN 104t, a handover request message. The T-RAN 104t receives the handover request message from the AMF 106. The handover request message comprises at least one of the following parameters: source to target transparent container, MM N2 information, MM N1 information and SM N2 information list.

The AMF 106 determines the T-RAN 104t based on target ID. The AMF 106 may allocate a GUTI valid for the UE 102 in the AMF 106 and in target TAI.

The source to target transparent container is forwarded as received from the S-RAN 104s. The MM N2 information includes e.g. security information and handover restriction list. The MM N1 information may GUTI and is sent transparent via the T-RAN 104t, the AMF 106 and the S-RAN 104s to the UE 102.

The SM N2 information list includes SM N2 information from SMFs 108 in the PDU handover response messages received until end of step 406.

Step 410

This step is seen in FIG. 4a. This step corresponds to step 315 in FIG. 3b. The T-RAN 104t sends to the AMF 106a handover request acknowledge message. The AMF 106a receives the handover request acknowledge message from the T-RAN 104t. The handover request acknowledge message comprises at least one of the following parameters: target to source transparent container, SM N2 response list and PDU sessions failed to be setup list.

The target to source transparent container includes a UE container with an access stratum part and a NAS part. The UE container is sent transparently via the AMF 106 and the S-RAN 104s to the UE 102.

The information provided to the S-RAN 104s also contains a list of PDU session IDs indicating PDU sessions failed to be setup and reason for failure. The reason for failure may be e.g. a SMF decision, a SMF response too late, or a T-RAN decision.

The NAS part of the UE container corresponds to the MM N1 information.

The SM N2 response list includes, per each received SM N2 information and by SMF accepted PDU session for N2 handover, a PDU session ID and an SM N2 response indicating the PDU session ID and if the T-RAN 104a accepted the N2 handover request for the PDU session. For each by T-RAN accepted PDU session for N2 handover, the SM N2 response includes N3 user plane address and tunnel ID of the T-RAN 104t.

Step 411

This step is seen in FIG. 4a. This step corresponds to step 316 in FIG. 3b. The AMF 106 sends to the SMF 108, a modify PDU request message. The SMF 108 receives the modify PDU request message from the AMF 106. The modify PDU request message comprises at least one of the following parameters: PDU session ID and SM N2 response.

For each from T-RAN received SM N2 response included in SM N2 response list, the AMF 106 sends the received SM N2 response to the SMF 108 indicated by the respective PDU Session ID.

Step 412

This step is seen in FIG. 4a. This step corresponds to step 317 in FIG. 3b. The SMF 108 sends to the AMF 106 a modify PDU response message. The AMF 106 receives the modify PDU response message from the SMF 108. The modify PDU response message comprises a PDU session ID. This message is sent for each received modify PDU request message.

The SMF 108 performs preparations for N2 handover by indicating the N3 user plane address and tunnel ID of T-RAN 104t to the UPF 110 if the N2 handover is accepted by the T-RAN 104t. If the N2 handover is not accepted by the T-RAN 104t, the SMF 108 deallocates the N3 user plane address and the tunnel ID of the selected UPF 110.

The SMF 108 acknowledges the modify request message by sending modify PDU response message to AMF 106.

Step 413

This step is seen in FIG. 4a. This step corresponds to step 319 in FIG. 3c. The AMF 106 sends to the S-RAN 106s, a handover Command. The S-RAN 106s receives the handover command from the AMF 106. The handover command comprises at least one of the following parameters: target to source transparent container and PDU sessions failed to be setup list.

The target to source transparent container is forwarded as received from the AMF 106.

The S-RAN 104s uses the PDU sessions failed to be setup list and the indicated reason for failure to decide if to proceed with the N2 handover procedure.

Step 414

This step is seen in FIG. 4a. This step corresponds to step 320 in FIG. 3c. The S-RAN 104s sends to the UE 102, a handover command. The UE 102 receives the handover command from the S-RAN 104a. The handover command comprises a UE container.

The UE container is sent transparently from the T-RAN 104t via the AMF 106 to the S-RAN 104s and is provided to the UE 102 by the S-RAN 104s.

Step 415

This step is seen in FIG. 4b. This step corresponds to step 321 in FIG. 3c. The UE 102 synchronizes to the new cell. The new cell may also be referred to as a target cell.

Step 416

This step is seen in FIG. 4b. This step corresponds to step 322 in FIG. 3c. The UE 102 sends a handover confirm message to the T-RAN 104t. The T-RAN 104t receives the handover confirm message from the UE 102.

After the UE 102 has successfully synchronized to the target cell, it sends a handover confirm message to the T-RAN 104t. Handover is by this message considered as successful by the UE 102.

Step 417

This step is seen in FIG. 4b. This is an optional step. This step corresponds to step 323 in FIG. 3c. The UE 102 may send, via the T-RAN 104t, uplink user plane data to the UPF 110.

Step 418

This step is seen in FIG. 4b. This step corresponds to step 324 in FIG. 3c. The T-RAN 104t sends a handover notify message to the AMF 106. The AMF 106 receives the handover notify message from the T-RAN 104t. The handover is by this message considered as successful in the T-RAN 104t.

Step 419

This step is seen in FIG. 4b. This step corresponds to step 325 in FIG. 3c. The AMF 106 sends a handover complete message to the SMF 108. The SMF 108 receives the handover complete message from the AMF 106. The handover complete message comprises a PDU session ID.

The handover complete is sent per each PDU session to the corresponding SMF 108 to indicate the success of the N2 handover.

Step 420

This step is seen in FIG. 4b. This step corresponds to step 327 in FIG. 3c. The SMF 108 sends a handover complete acknowledgement to the AMF 106. The AMF 106 receives a handover complete acknowledgement from the SMF 108. The handover complete acknowledgement comprises a PDU session ID.

The SMF 108 indicates to the selected UPF 110 that downlink user plane for the indicated PDU session may be switched to the T-RAN 104t. The SMF 108 confirms reception of the handover complete.

Step 421

This step is seen in FIG. 4b. The step is an optional step. This step corresponds to step 326 in FIG. 3c. The UPF 110 may send downlink user plane data via the T-RAN 104t to the UE 102. The UE 102 receives downlink user plane data via the T-RAN 104t from the UPF 110.

Step 422

This step is seen in FIG. 4b. This step corresponds to step 332 in FIG. 3d. The AMF 106 sends to the S-RAN 104s a UE context release command. The S-RAN 104s receives the UE context release command from the S-RAN 104s.

Step 423

This step is seen in FIG. 4b. This step corresponds to step 333 in FIG. 3d. The S-RAN 104s sends to the AMF 106 a UE context release complete. The AMF 106 receives the UE context release complete message from the S-RAN 104s. The S-RAN 104s releases its resources related to the UE 102 and responds with a UE context release complete message.

Figure 5:
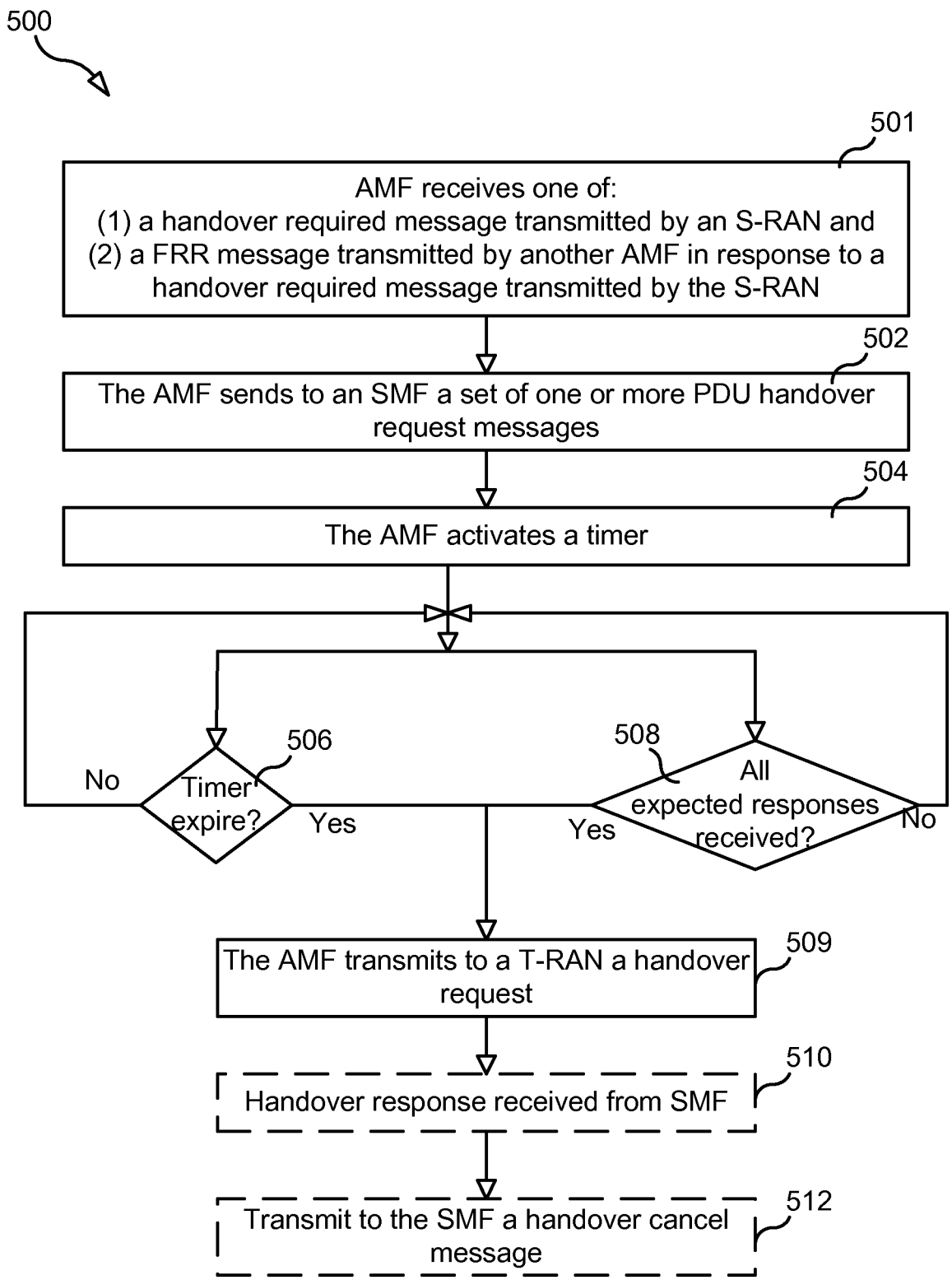
FIG. 5 is a flow chart illustrating a process.

FIG. 5 is a flow chart illustrating a process 500 according to some embodiments. Process 500 may begin in step 501, in which an AMF 106 receives one of:

(1) A handover required message transmitted by an S-RAN 104s, and
(2) A FRR message transmitted by another AMF 106 in response to a handover required message transmitted by the S-RAN 104s.

Step 501 corresponds to steps 301 and 303 in FIG. 3a and step 402 in FIG. 4a.

In step 502, the AMF 106 sends to one or several SMFs 108 a set of one or more PDU handover request messages. For example, in step 502 the AMF 106 determines, based on the message received in step 501, a set of PDU sessions that are indicated as being a candidate for a handover and, for each PDU session that is determined to be indicated as being a candidate for the handover, the AMF 106 sends to an SMF 108 a PDU handover request message that includes a PDU session ID for identifying the determined PDU session. Step 502 corresponds to step 306 in FIG. 3a and step 403 in FIG. 4a.

In step 504, the AMF 106 activates a timer. Setting of the timer is described in detail earlier. Step 504 corresponds to step 306 in FIG. 3a and step 403 in FIG. 4a.

In step 506, the AMF 106 determines, based on the timer, whether a certain amount of time, i.e. X amount of time, has elapsed since the timer was activated. If the AMF 106 determines that X amount of time has elapsed, then the process proceeds to step 509. Step 506 corresponds to step 308 in FIG. 3a and step 405 in FIG. 4a.

In step 508, the AMF 106 determines whether it has received from the SMF 108 a response message for each one of the one or more PDU handover request messages transmitted in step 502. If the AMF 106 determines that it has received all of the response messages, then the process proceeds to step 509. Step 508 corresponds to step 308 in FIG. 3a and step 405 in FIG. 4a.

In step 509, the AMF 106 transmits to a T-RAN 104t a handover request. The handover request message includes: source to target transparent container that was transmitted by an S-RAN 104s, MM N2 info, MM N1 info, and SM N2 info list that includes, for each of the response messages, SM N2 info that was included in the response message. Step 509 corresponds to step 314 in FIG. 3b and step 409 in FIG. 4a.

Process 500 may also include steps 510 and 512. In step 510, a response message is received after the X amount of time has elapsed. Consequently, in step 512 the AMF 106 transmits to the SMF 108 that transmitted the late response message a PDU handover cancel message. Step 512 corresponds to step 309 in FIG. 3b and step 406 in FIG. 4a.

Figure 6:
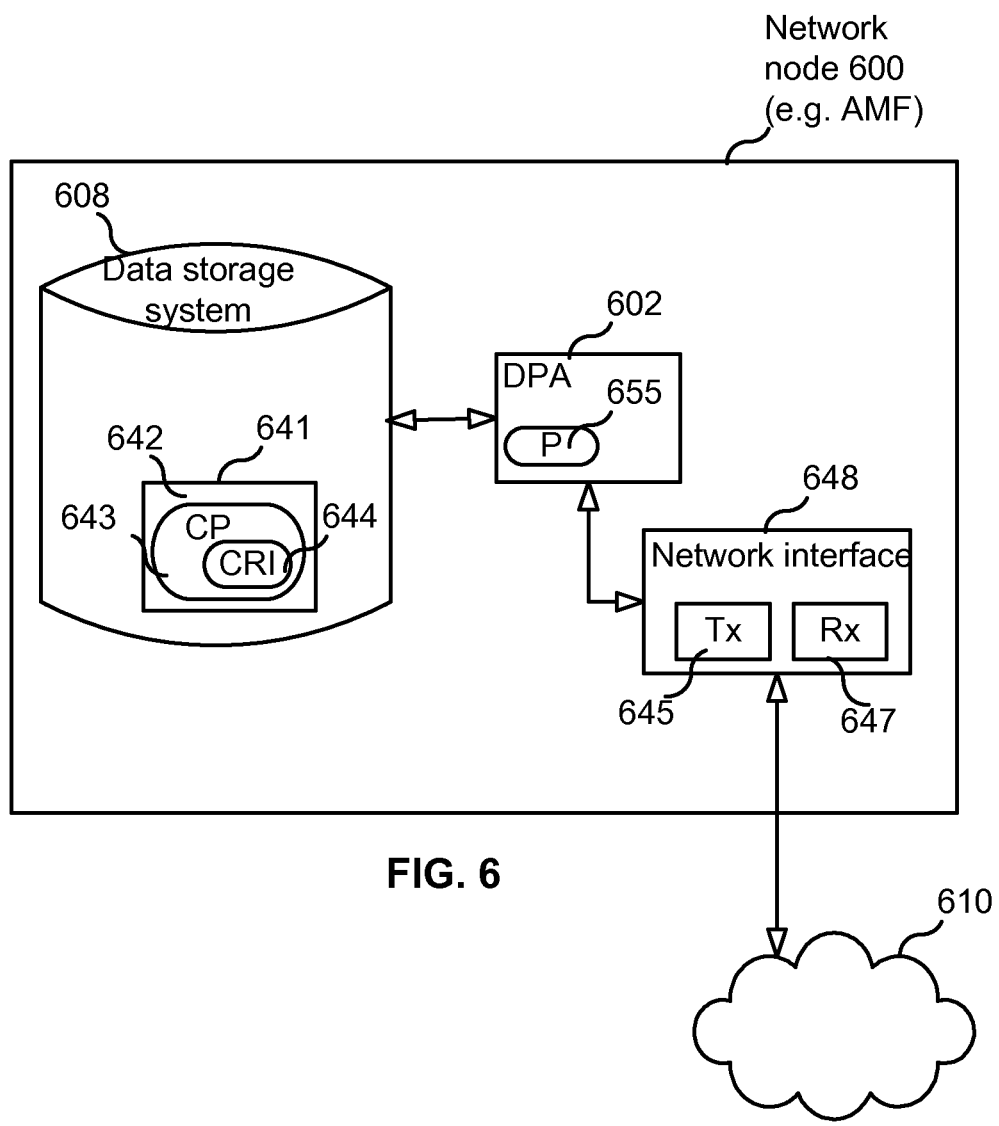
FIG. 6 is a block diagram of a network node.

FIG. 6 is a block diagram of network node 600 according to some embodiments. The network node 600 may be e.g., a core network node such as an AMF 106 or SMF 108, or a RAN node 104. As shown in FIG. 6, the network node 600 may comprise: a Data Processing Apparatus (DPA) 602, which may include one or more processors (P) 655, e.g., a general purpose microprocessor and/or one or more other processors, such as an application specific integrated circuit (ASIC), field-programmable gate arrays (FPGAs), and the like. Furthermore, the network node 600 may comprise a network interface 648 comprising a transmitter (Tx) 645 and a receiver (Rx) 647 for enabling the network node 600 to transmit data to and receive data from other nodes connected to a network 610, e.g., an Internet Protocol (IP) network, to which network interface 648 is connected; and local storage unit, a.k.a., data storage system 608, which may include one or more non-volatile storage devices and/or one or more volatile storage devices, e.g., random access memory (RAM). In embodiments where network node 600 includes a general purpose microprocessor, a Computer Program Product (CPP) 641 may be provided. CPP 641 includes a computer readable medium (CRM) 642 storing a Computer Program (CP) 643 comprising Computer Readable Instructions (CRI) 644. CRM 642 may be a non-transitory computer readable medium, such as, but not limited to, magnetic media e.g. a hard disk, optical media, memory devices e.g., random access memory, and the like. In some embodiments, the CRI 644 of computer program 643 is configured such that when executed by data processing apparatus 602, the CRI 644 causes the network node 600 to perform steps described herein, e.g., steps described herein with reference to the flow charts and/or message flow diagrams. In other embodiments, the network node 600 may be configured to perform steps described herein without the need for code. That is, for example, the data processing apparatus 602 may consist merely of one or more ASICs. Hence, the features of the embodiments described herein may be implemented in hardware and/or software.

Figure 7:
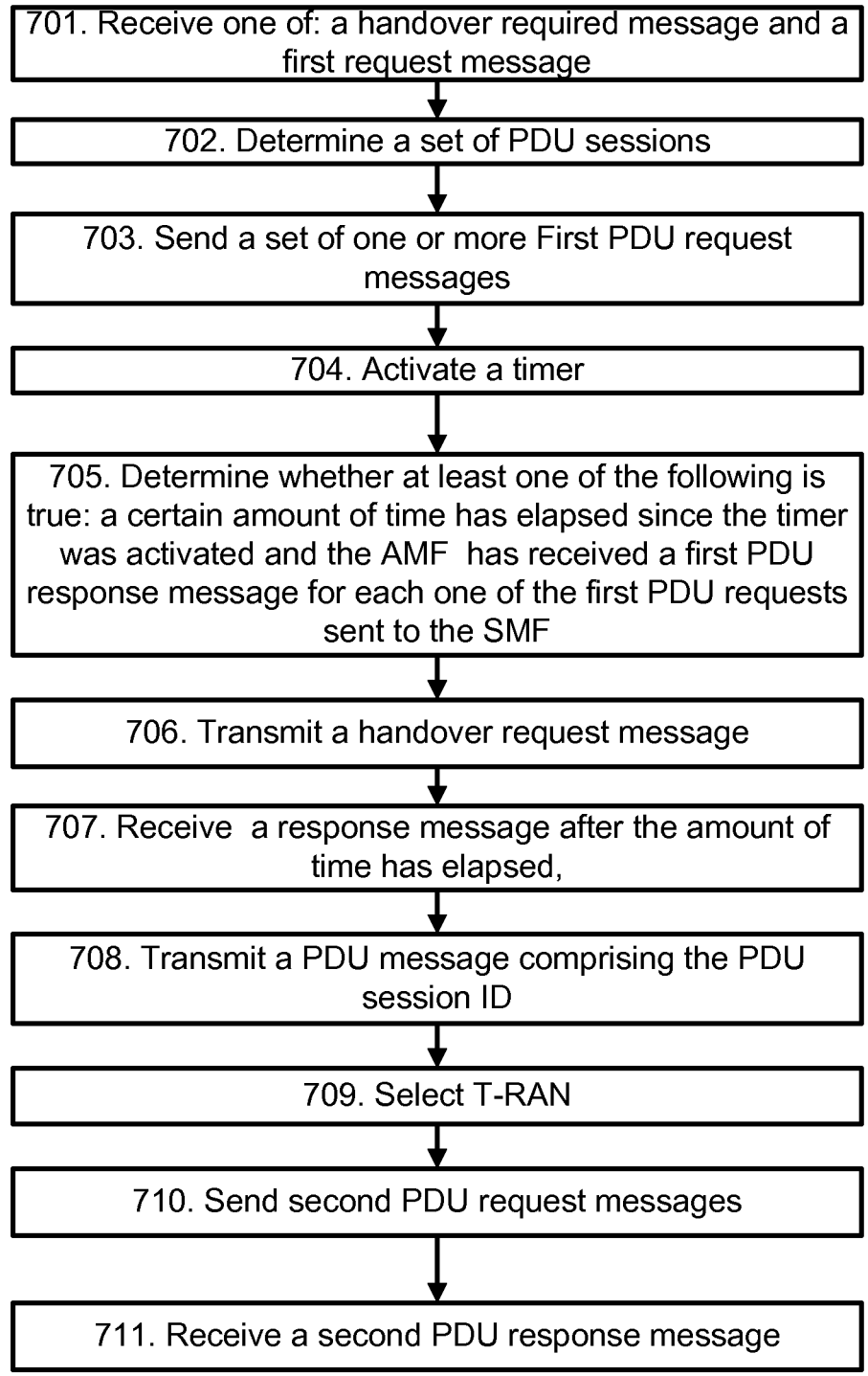
FIG. 7 is a flow chart illustrating an example method performed by the AMF.

The method described above will now be described seen from the perspective of the AMF 106. FIG. 7 is a flowchart describing the present method in the AMF 106, for handling handover. The handover may be a N2 handover. The method comprises at least one of the following steps to be performed by the AMF 106, which steps may be performed in any suitable order than described below:

Step 701

This step corresponds to steps 301 and 303 in FIG. 3a, step 402 in FIG. 4 and step 501 in FIG. 5. The AMF 106 receives one of: a handover required message and a first request message. The handover required message is received from an S-RAN 104s and the first request message is received from another AMF 106 in response to the handover required message transmitted by the S-RAN 104s. In other words, the handover required message is transmitted by an S-RAN 104s and the first request message is transmitted by another AMF 106.

The AMF 106 may be a T-AMF 106t that should serve a UE 102 after the handover instead of an S-AMF 106s which currently serves the UE 102, and the other AMF may be the S-AMF 106s.

The first message may be a FFR message or a Namf_CreateUEContext Request message.

Step 702

This step corresponds to step 302 in FIG. 3a. The AMF 106 may determine, based on the received handover required message or the first request message, a set of PDU sessions that are indicated as being a candidate for the handover.

Step 703

This step corresponds to step 306 in FIG. 3a, step 403 in FIG. 4a and step 502 in FIG. 5. The AMF 106 sends to one or several SMFs 108 a set of one or more first PDU request messages.

The first PDU request message may be sent for each PDU sessions that is determined to be indicated as being a candidate for the handover, and the first PDU request message may include a PDU session ID for identifying the determined PDU session.

The handover request message may include: a source to target transparent container that was transmitted by an S-RAN 104s, MM N2 information, MM N1 information and SM N2 information list. The SM N2 information list may include, for each of a first PDU response messages, SM N2 information that was included in the first PDU response message.

The first PDU request message may be a PDU handover request message or an Nsmf_PDUSession_Update Request message.

Step 704

This step corresponds to step 306 in FIG. 3a, step 403 in FIG. 4a and step 504 in FIG. 5. The AMF 106 activates a timer.

Step 705

This step corresponds to step 308 in FIG. 3a, step 405 in FIG. 4a and steps 506 and 508 in FIG. 5. The AMF 106 determines whether at least one of the following is true: a certain amount of time has elapsed since the timer was activated and the AMF 106 has received a response message for each one of the first PDU request messages sent to the SMF 108. The amount of time may be determined based on values included in the first request message.

Step 706

This step corresponds to step 314 in FIG. 3b, step 409 in FIG. 4a and step 509 in FIG. 5. The AMF 106 transmits a handover request message to a T-RAN 104*t* as a result of determining that at least one of the conditions in step 705 is true.

Step 707

This step corresponds to step 510 in FIG. 5. The AMF 106 may receive, from the SMF 108, a response message after the amount of time has elapsed. The response message may comprise a PDU session ID.

Step 708

This step corresponds to step 309 in FIG. 3*b*, step 406 in FIG. 4*a* and step 512 in FIG. 5. As a result of receiving the response message after the amount of time has elapsed, the AMF 106 may transmit to the SMF 108 a PDU message comprising the PDU session ID.

The PDU message may be a PDU handover cancel message or an Nsmf_PDUSession_Update Request message.

Step 709

This step corresponds to step 313 in FIG. 3*b*. The AMF 106 may select, based on the target ID, a T-RAN 104*t* if any SMF 108 needs to be reallocated.

Step 710

This step corresponds to step 311 in FIG. 3*b* and step 407 in FIG. 4*a*. The AMF 106 may send at least one second PDU request messages to the SMF 108. The second PDU request message may be sent for each PDU session that does not have an active UP connection. The second PDU request message may include at least one of a PDU session ID, a target ID and T-AMF control plane information. The second PDU request message may be sent to the selected T-RAN 104*t* from step 709.

The second PDU request message may be a modify PDU request message or an Nsmf_PDUSession_Update Request message.

Step 711

This step corresponds to step 312 in FIG. 3*b* and step 408 in FIG. 4*a*. The AMF 106 may receive a second PDU response message from the SMF 108. The second PDU response message may include at least one of the PDU session ID and the T-SMF control plane information. The second PDU response message may be received from the selected T-RAN 104*t* from step 709.

The second PDU response message may be a modify PDU response message or an Nsmf_PDUSession_Update Response message.

The method illustrated in FIG. 7 comprises several messages, and these messages may have different names. Table 1 below provides an overview of some examples of the names that may be used for these messages:

TABLE 1

| Message name used in FIG. 7 | Alternative message names |
|---|---|
| First request message | FFR message |
| | Namf_CreateUEContext Request |
| First PDU request message | PDU handover request message |
| | Nsmf_PDUSession_Update Request |
| PDU message | PDU handover cancel message |
| | Nsmf_PDUSession_Update Request |
| Second PDU request message | Modify PDU request message |
| | Nsmf_PDUSession_Update Request |
| Second PDU response message | Modify PDU response message |
| | Nsmf_PDUSession_Update Response |

Figure 8:
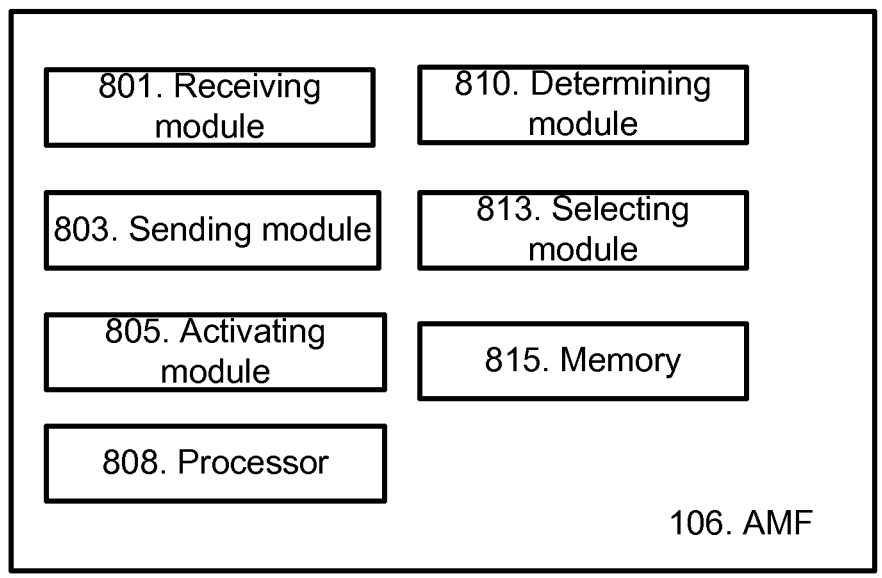
FIG. 8 is a block diagram illustrating an example of an AMF.

To perform the method steps shown in FIG. 7 for handling handover, the AMF 106 may comprises an AMF arrangement as shown in FIG. 8. The handover may be a N2 handover.

The AMF 106 is adapted to, e.g. by means of a receiving module 801, receive one of: a handover required message and a first request message. The handover required message is received from an S-RAN 104*s* and the first request message is received from another AMF 106 in response to the handover required message transmitted by the S-RAN 104*s*. The AMF 106 may be a T-AMF 106*t* that should serve a UE 102 after the handover instead of an S-AMF 106*s* which currently serves the UE 102, and the other AMF 106 may be the S-AMF 106*s*. The receiving module 801 in FIG. 8 may correspond to the receiver 647 in FIG. 6. The receiving module 01 may also be referred to as a receiving unit, a receiving means, a receiving circuit, means for receiving, input unit etc. The receiving module 801 may be a receiver, a transceiver etc. The receiving module 801 may be a wireless receiver of the AMF 106 of a wireless or fixed communications system.

The AMF 106 is adapted to, e.g. by means of a sending module 803, send to a SMF 108, a set of one or more first PDU request messages. The sending module 803 may also be referred to as a sending unit, a sending means, a sending circuit, means for sending, output unit etc. sending module 803 may be a transmitter, a transceiver etc. The sending module 803 may be a wireless transmitter of the AMF 106 of a wireless or fixed communications system. The sending module 803 may also be referred to as a transmitting module. The sending module 803 in FIG. 8 may correspond to the transmitter 645 in FIG. 6.

The AMF 106 is adapted to, e.g. by means of an activating module 805, activate a timer. The activating module 805 may also be referred to as an activating unit, an activating means, an activating circuit, means for activating etc. The activating module 805 may be a processor 808 of the AMF 106 or comprised in the processor 808. The processor 808 in FIG. 8 may correspond to the processor 655 in FIG. 6.

The AMF 106 is adapted to, e.g. by means of a determining module 810, determine whether at least one of the following is true: a certain amount of time has elapsed since the timer was activated and the AMF 106 has received a first PDU response message for each one of the first PDU requests sent to the SMF 108. The determining module 810 may also be referred to as a determining unit, a determining means, a determining circuit, means for determining etc. The determining module 810 may be the processor 808 of the AMF 106 or comprised in the processor 808.

The AMF 106 is adapted to, e.g. by means of the sending module 803, transmit a handover request message to a T-RAN 104*t* as a result of determining that at least one of the conditions is true. The first PDU request message may be sent for each PDU sessions that is determined to be indicated as being a candidate for the handover, and the first PDU request message may include a PDU session ID for identifying the determined PDU session. The handover request message may include: a source to target transparent container that was transmitted by an S-RAN 104*s*, MM, N2 information, MM N1 information, and SM, N2 information list that includes, for each of the first PDU response messages, SM N2 information that was included in the first PDU response message.

The AMF 106 may be further adapted to, e.g. by means of the determining module 810, determine, based on the received handover required message or the first request message, a set of PDU sessions that are indicated as being a candidate for the handover.

The AMF 106 may be further adapted to, e.g. by means of the receiving module 801, receive, from the SMF 108, a response message after the amount of time has elapsed, wherein the response message comprises a PDU session ID.

The AMF 106 may be further adapted to, e.g. by means of the sending module 803, as a result of receiving the response message after the amount of time has elapsed, transmit to the SMF 108 a PDU message comprising the PDU session ID. The amount of time may be determined based on values included in the first request message.

The AMF 106 may be further adapted to, e.g. by means of the sending module 803, send at least one second PDU request messages to the SMF 108. The second PDU request message may be sent for each PDU session that does not have an active UP connection. The second PDU request message may include at least one of a PDU session ID, a target ID and T-AMF control plane information.

The AMF 106 may be further adapted to, e.g. by means of the receiving module 801, receive a second PDU response message from the SMF 108. The second PDU response message may include at least one of the PDU session ID and the T-SMF control plane information.

The AMF 106 may be further adapted to, e.g. by means of a selecting module 813, select, based on the target ID, a T-RAN 104*t* if any SMF 108 needs to be reallocated. The second PDU request message may be sent to the selected T-RAN 104*t* and the second PDU response message may be received from the selected T-RAN 104*t*. The selecting module 813 may also be referred to as a selecting unit, a selecting means, a selecting circuit, means for selecting etc. The selecting module 813 may be the processor 808 of the AMF 106 or comprised in the processor 808.

The AMF 106 may comprise a memory 815. The memory 815 comprises instructions executable by the processor 808. The memory 815 comprises one or more memory units. The memory 815 is arranged to be used to store data, received data streams, power level measurements, messages, timer, condition information, candidate handover sessions, information, lists, containers, ID, threshold values, time periods, configurations, schedulings, and applications to perform the methods herein when being executed in the AMF 106.

Those skilled in the art will also appreciate that the receiving module 801, the sending module 803, the activating module 805, the determining module 810 and the selecting module 813 described above may refer to a combination of analog and digital circuits, and/or one or more processors configured with software and/or firmware, e.g. stored in a memory, that when executed by the one or more processors such as the processor 808 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments herein for handling handover may be implemented through one or more processors, such as a processor 808 in the AMF 106 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the AMF 106. One such carrier may be in the form of a CD ROM disc. It is however feasible with other data carriers such as a memory stick. The computer program code may furthermore be provided as pure program code on a server and downloaded to the AMF 106.

Some embodiments described herein may be summarised in the following manner:

A node, e.g. the AMF 106, for performing a handover method. The node may be adapted to:
- receive one of: (1) a handover required message transmitted by an S-RAN 104*s* and (2) a first request message transmitted by another AMF 106 in response to a handover required message transmitted by the S-RAN 104*s*;
- send to an SMF 108 a set of one or more first PDU request messages;
- activate a timer;
- determine whether at least one of the following is true: (1) a certain amount of time, i.e. X amount of time, has elapsed since the timer was activated and (2) the node has received a response message for each one of the first PDU request messages sent to the SMF 108; and
- as a result of determining that at least one of the conditions is true, then transmit to a T-RAN 104*t* a handover request message.

A node, e.g. the AMF 106, for performing a handover method. The node may comprise:
- A receiving module configured to employ a receiver 647 to receive one of: (1) a handover required message transmitted by an S-RAN 104*s* and (2) a first request message transmitted by another AMF 106 in response to a handover required message transmitted by the S-RAN 104*s*. The receiving module may be the one illustrated in FIG. 8.
- A sending module configured to employ a transmitter 645 to send to an SMF 108 a set of one or more first PDU request messages. The sending module may be the one illustrated in FIG. 8.
- A timer module configured to activate a timer.
- A determining module configured to determine whether at least one of the following is true: (1) a certain amount of time, i.e. X amount of time, has elapsed since the timer was activated and (2) the node has received a first PDU response message for each one of the first PDU request messages sent to the SMF 108. The determining module may be the one illustrated in FIG. 8.
- A handover request transmitting module configured such that as a result of the determining module determining that at least one of the conditions is true, the handover request transmitting module employs the transmitter to transmit to a T-RAN 104*t* a handover request.

A node, e.g. the AMF 106, for performing a handover method. The node may comprise:
- A receiver 647;
- A transmitter 645;
- A data storage system 608; and
- A data processing apparatus 602 comprising a processor 655.

The data processing apparatus is coupled to the data storage system, the transmitter 645, and the receiver 647, and the data processing apparatus 602 is configured to:
- employ the receiver 647 to receive one of: (1) a handover required message transmitted by an S-RAN 104*s* and (2) a first request message transmitted by another AMF 106 in response to a handover required message transmitted by the S-RAN 104*s*;

employ a transmitter 645 to send to an SMF 108 a set of one or more first PDU request messages;

activate a timer;

determine whether at least one of the following is true: (1) a certain amount of time, i.e. X amount of time, has elapsed since the timer was activated and (2) the node has received a first PDU response message for each one of the first PDU request messages sent to the SMF 108; and to as a result of the determining module determining that at least one of the conditions is true, employ the transmitter to transmit to a T-RAN 104*t* a handover request.

In some embodiments, a computer program may comprise instructions which, when executed on at least one processor, cause the at least one processor to carry out the method steps 701-711. A carrier may comprise the computer program, and the carrier is one of an electronic signal, optical signal, radio signal or computer readable storage medium.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "adapted to" used herein may also be referred to as "arranged to", "configured to", "capable of" or "operative to".

It should also be emphasised that the steps of the methods defined in the appended claims may, without departing from the embodiments herein, be performed in another order than the order in which they appear in the claims.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first Access and Mobility Management Function (AMF) for handling handover, the method comprising:

receiving a message, wherein the message is a handover required message transmitted by a source radio access network (S-RAN) or the message is a first request message transmitted by a second AMF in response to the handover required message transmitted by the S-RAN;

in response to receiving the message, activating a timer and sending to a Session Management Function (SMF) a set of one or more first Protocol Data Unit (PDU) request messages;

determining whether at least one of the following conditions is true: a certain amount of time has elapsed since the timer was activated or the first AMF has received a first PDU response message for each one of the first PDU request messages sent to the SMF; and transmitting a handover request message to a Target-Radio Access Network (T-RAN) as a result of determining that at least one of the conditions is true.

2. The method of claim 1, further comprising:

determining, based on the received handover required message or the first request message, a set of PDU sessions that are indicated as being a candidate for the handover; and wherein the first PDU request message is sent for each PDU sessions that is determined to be indicated as being a candidate for the handover, and wherein the first PDU request message includes a PDU session ID for identifying the determined PDU session.

3. The method of claim 1, wherein the handover request message includes: a source to target transparent container that was transmitted by an S-RAN, Mobility Management (MM) N2 information, MM N1 information, and Session Management (SM) N2 information list that includes, for each of the first PDU response messages, SM N2 information that was included in the first PDU response message.

4. The method of claim 1, further comprising:

receiving, from the SMF, a response message after the amount of time has elapsed, wherein the response message comprises a PDU session ID; and as a result of receiving the response message after the amount of time has elapsed, transmitting to the SMF a PDU message comprising the PDU session ID.

5. The method of claim 4, wherein the PDU message is a PDU handover cancel message or an Nsmf_PDUSession_Update Request message.

6. The method of claim 1, further comprising:

sending at least one second PDU request messages to the SMF, wherein the second PDU request message is sent for each PDU session that does not have an active User Plane (UP) connection, wherein the second PDU request message includes at least one of: a PDU session ID, a target ID, or target AMF (T-AMF) control plane information; and receiving a second PDU response message from the SMF, wherein the second PDU response message includes at least one of: the PDU session ID or the T-AMF control plane information.

7. The method of claim 6, further comprising:

selecting, based on the target ID, a Target-RAN (T-RAN) if any SMF needs to be reallocated; and wherein the second PDU request message is sent to the selected T-RAN and the second PDU response message is received from the selected T-RAN.

8. The method of claim 6, wherein the second PDU request message is a Modify PDU request message or a Nsmf_PDUSession_Update Request message, and wherein the second PDU response message is a Modify PDU response message or an Nsmf_PDUSession_Update Response message.

9. The method of claim 1, wherein the amount of time is determined based on values included in the first request message.

10. The method of claim 1, wherein the handover is a N2 handover.

11. The method of claim 1, wherein the first AMF is a Target-AMF (T-AMF) that should serve a user equipment (UE) after the handover instead of a Source-AMF (S-AMF) which currently serves the UE.

12. The method of claim 1, wherein the first request message is a Forward Relocation Request (FFR) message or a Namf_CreateUEContext Request message, and wherein the first PDU request message is a PDU handover request message or an Nsmf_PDUSession_Update Request message.

13. A computer program product comprising a non-transitory computer readable medium storing a computer program comprising instructions which, when executed on at least one processor, cause the at least one processor to carry out the method of claim 1.

14. An Access and Mobility Management Function (AMF) for handling handover, the AMF comprising:
memory; and
processing circuitry coupled to the memory, wherein the AMF is configured to:
receive a message, wherein the message is one of: a handover required message transmitted by a source radio access network (S-RAN) or a first request message transmitted by another AMF in response to the handover required message transmitted by the S-RAN;
in response to receiving the message, activate a timer and send to a Session Management Function (SMF) a set of one or more first Protocol Data Unit (PDU) request messages;
determine whether at least one of the following conditions is true: a certain amount of time has elapsed since the timer was activated or the AMF has received a first PDU response message for each one of the first PDU requests sent to the SMF; and
transmit a handover request message to a Target-Radio Access Network, (T-RAN) as a result of determining that at least one of the conditions is true.

15. The AMF of claim 14, being further adapted to:
determine, based on the received handover required message or the first request message, a set of PDU sessions that are indicated as being a candidate for the handover;
wherein the first PDU request message is sent for each PDU sessions that is determined to be indicated as being a candidate for the handover, and
wherein the first PDU request message includes a PDU session ID for identifying the determined PDU session.

16. The AMF of claim 14, wherein the handover request message includes: a source to target transparent container that was transmitted by an S-RAN, Mobility Management (MM) N2 information, MM N1 information, and Session Management (SM) N2 information list that includes, for each of the first PDU response messages, SM N2 information that was included in the first PDU response message.

17. The AMF of claim 14, being further adapted to:
receive, from the SMF, a response message after the amount of time has elapsed, wherein the response message comprises a PDU session ID; and to
as a result of receiving the response message after the amount of time has elapsed, transmit to the SMF a PDU message comprising the PDU session ID.

18. The AMF of claim 17, wherein the PDU message is a PDU handover cancel message or an Nsmf_PDUSession_Update Request message.

19. The AMF of claim 14, being further adapted to:
send a second PDU request messages to the SMF, wherein the second PDU request message includes at least one of: a PDU session ID, a target ID, and target AMF (T-AMF) control plane information; and
receive a second PDU response message from the SMF, wherein the second PDU response message includes at least one of: the PDU session ID or the T-AMF control plane information.

20. The AMF of claim 19, being further adapted to:
select, based on the target ID, a Target-RAN (T-RAN) if any SMF needs to be reallocated; and wherein the second PDU request message is sent to the selected T-RAN and the second PDU response message is received from the selected T-RAN.

* * * * *